US012429790B2

(12) United States Patent
Tominaga et al.

(10) Patent No.: US 12,429,790 B2
(45) Date of Patent: Sep. 30, 2025

(54) TONER AND METHOD FOR PRODUCING TONER

(71) Applicant: CANON KABUSHIKI KAISHA, Tokyo (JP)

(72) Inventors: Tsuneyoshi Tominaga, Shizuoka (JP); Daisuke Yoshiba, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 17/814,102

(22) Filed: Jul. 21, 2022

(65) Prior Publication Data

US 2023/0051836 A1 Feb. 16, 2023

(30) Foreign Application Priority Data

Jul. 28, 2021 (JP) ................................ 2021-123717

(51) Int. Cl.
*G03G 9/093* (2006.01)
*G03G 9/08* (2006.01)
*G03G 9/087* (2006.01)

(52) U.S. Cl.
CPC ....... *G03G 9/09371* (2013.01); *G03G 9/0804* (2013.01); *G03G 9/08755* (2013.01); *G03G 9/09314* (2013.01); *G03G 9/09385* (2013.01)

(58) Field of Classification Search
CPC ............ G03G 9/09371; G03G 9/0804; G03G 9/08755; G03G 9/09314; G03G 9/083; G03G 9/087; G03G 9/0806
See application file for complete search history.

(56) References Cited

U.S. PATENT DOCUMENTS

| | | | |
|---|---|---|---|
| 7,537,877 | B2 | 5/2009 | Yoshiba |
| 7,544,455 | B2 | 6/2009 | Yoshiba |
| 7,700,254 | B2 | 4/2010 | Moribe |
| 7,740,998 | B2 | 6/2010 | Yamazaki |
| 7,796,926 | B2 | 9/2010 | Matsuda |
| 7,855,042 | B2 | 12/2010 | Kobori |
| 7,858,282 | B2 | 12/2010 | Ayaki |
| 8,057,977 | B2 | 11/2011 | Moribe |
| 8,372,573 | B2 | 2/2013 | Ayaki |
| 8,383,313 | B2 | 2/2013 | Ayaki |
| 8,551,680 | B2 | 10/2013 | Ayaki |
| 9,097,998 | B2 | 8/2015 | Yamazaki |
| 9,128,400 | B2 | 9/2015 | Takahashi |
| 9,201,323 | B2 | 12/2015 | Nishikawa |
| 9,250,548 | B2 | 2/2016 | Nomura |
| 9,261,804 | B2 | 2/2016 | Yamazaki |
| 9,341,970 | B2 | 5/2016 | Yoshiba |
| 9,423,708 | B2 | 8/2016 | Tominaga |
| 9,606,462 | B2 | 3/2017 | Nomura |
| 9,632,441 | B2 | 4/2017 | Abe |
| 9,720,340 | B2 | 8/2017 | Tominaga |
| 9,733,583 | B2 | 8/2017 | Kuroki |
| 9,733,584 | B2 | 8/2017 | Masumoto |
| 9,785,077 | B2 | 10/2017 | Abe |
| 9,829,818 | B2 | 11/2017 | Yoshiba |
| 9,829,820 | B2 | 11/2017 | Masumoto |
| 9,897,932 | B2 | 2/2018 | Hotta |
| 9,921,501 | B2 | 3/2018 | Mochizuki |
| 9,971,263 | B2 | 5/2018 | Fukudome |
| 10,101,683 | B2 | 10/2018 | Nishikawa |
| 10,114,303 | B2 | 10/2018 | Katsura |
| 10,241,430 | B2 | 3/2019 | Kimura |
| 10,289,016 | B2 | 5/2019 | Fukudome |
| 10,295,921 | B2 | 5/2019 | Ohmori |
| 10,303,074 | B2 | 5/2019 | Yamawaki |
| 10,429,757 | B2 | 10/2019 | Yoshida |
| 10,503,090 | B2 | 12/2019 | Tominaga |
| 10,545,422 | B2 | 1/2020 | Yamawaki |
| 10,578,990 | B2 | 3/2020 | Tsuda |
| 10,635,011 | B2 | 4/2020 | Umeda |
| 10,678,155 | B2 | 6/2020 | Terui |
| 10,732,529 | B2 | 8/2020 | Yoshiba |
| 10,747,133 | B2 | 8/2020 | Yagi |
| 10,747,134 | B2 | 8/2020 | Watanabe |
| 10,768,540 | B2 | 9/2020 | Watanabe |
| 10,782,623 | B2 | 9/2020 | Yoshiba |
| 10,809,639 | B2 | 10/2020 | Yamawaki |
| 10,845,721 | B2 | 11/2020 | Tanaka |
| 10,942,463 | B2 | 3/2021 | Yoshiba |
| 10,942,465 | B2 | 3/2021 | Kototani |
| 10,942,466 | B2 | 3/2021 | Tominaga |
| 10,969,704 | B2 | 4/2021 | Kagawa |

(Continued)

FOREIGN PATENT DOCUMENTS

| | | | | | |
|---|---|---|---|---|---|
| EP | 3 674 806 | A1 | | 7/2020 | |
| JP | 8-248670 | A | | 9/1996 | |
| JP | 2001-228650 | A | | 8/2001 | |
| JP | 2004-287185 | A | | 10/2004 | |
| JP | 2007-25525 | A | | 2/2007 | |
| JP | 2007-241310 | A | | 9/2007 | |
| JP | 2008-158176 | A | | 7/2008 | |
| JP | 2009-186512 | A | | 8/2009 | |
| JP | 2009300848 | A | * | 12/2009 | .............. G03G 9/08 |
| JP | 2011-59261 | A | | 3/2011 | |
| JP | 2012-47914 | A | | 3/2012 | |
| JP | 2013-20113 | A | | 1/2013 | |
| JP | 2015-506494 | A | | 3/2015 | |
| JP | 6059251 | A | | 1/2017 | |
| JP | 2019-159001 | A | | 9/2019 | |
| JP | 2020-34901 | A | | 3/2020 | |
| JP | 2020-106816 | A | | 7/2020 | |
| WO | 2013/063291 | A1 | | 5/2013 | |

OTHER PUBLICATIONS

U.S. Appl. No. 13/991,348, filed Jun. 3, 2013, Shuhei Moribe.
U.S. Appl. No. 14/005,250, filed Sep. 13, 2013, Daisuke Yoshiba.
U.S. Appl. No. 14/421,782, filed Feb. 13, 2015, Koji Nishikawa.
U.S. Appl. No. 17/808,750, filed Jun. 24, 2022, Yuzo Seino.
U.S. Appl. No. 17/819,385, filed Aug. 12, 2022, Daisuke Yoshiba.

*Primary Examiner* — Peter L Vajda
*Assistant Examiner* — Grant Steven Seiler
(74) *Attorney, Agent, or Firm* — VENABLE LLP

(57) ABSTRACT

A toner comprising: a toner particle comprising a binder resin and boric acid; wherein the binder resin comprises an amorphous resin and a crystalline polyester resin, a content of the crystalline polyester resin in the toner is 30.00 to 80.00 mass %, and a content of the boric acid in the toner is 0.10 to 10.00 mass %.

6 Claims, 1 Drawing Sheet

(56) References Cited

U.S. PATENT DOCUMENTS

| | | | |
|---|---|---|---|
| 10,976,679 | B2 | 4/2021 | Tanaka |
| 11,003,104 | B2 | 5/2021 | Katsura |
| 11,003,105 | B2 | 5/2021 | Sato |
| 11,099,493 | B2 | 8/2021 | Komiya |
| 11,112,709 | B2 | 9/2021 | Saeki |
| 11,112,713 | B2 | 9/2021 | Akiyama |
| 11,169,460 | B2 | 11/2021 | Kototani |
| 11,181,844 | B2 | 11/2021 | Nagaoka |
| 11,249,408 | B2 | 2/2022 | Tsuda |
| 11,262,666 | B2 | 3/2022 | Yoshiba |
| 11,573,519 | B2 | 2/2023 | Fumita |
| 11,822,286 | B2 | 11/2023 | Kenmoku |
| 2005/0255399 | A1 | 11/2005 | Ichikawa |
| 2008/0227003 | A1 | 9/2008 | Honda et al. |
| 2009/0196658 | A1 | 8/2009 | Sugiura |
| 2012/0052430 | A1 | 3/2012 | Yamasaki |
| 2013/0171551 | A1 | 7/2013 | Sun |
| 2014/0295341 | A1 | 10/2014 | Fomitchev |
| 2015/0248072 | A1 | 9/2015 | Katsuta |
| 2016/0161874 | A1 | 6/2016 | Yamazaki |
| 2017/0010547 | A1 * | 1/2017 | Bejat et al. .............. G03G 9/08 |
| 2019/0243272 | A1 | 8/2019 | Sakurada et al. |
| 2020/0064751 | A1 | 2/2020 | Murayama |
| 2020/0073266 | A1 | 3/2020 | Ohtsu |
| 2020/0285169 | A1 | 9/2020 | Kubo |
| 2021/0223731 | A1 | 7/2021 | Suzuki |
| 2021/0255557 | A1 * | 8/2021 | Watanabe et al. ..... G03G 9/083 |
| 2021/0373450 | A1 | 12/2021 | Kawaguchi |
| 2021/0397110 | A1 | 12/2021 | Katsura |
| 2022/0121132 | A1 | 4/2022 | Yoshida |
| 2022/0121133 | A1 | 4/2022 | Yamawaki |
| 2022/0128916 | A1 | 4/2022 | Yoshida |
| 2022/0171302 | A1 | 6/2022 | Sato |
| 2022/0291601 | A1 | 9/2022 | Katsura |
| 2023/0042289 | A1 | 2/2023 | Tanaka |
| 2023/0047510 | A1 | 2/2023 | Tsuda |
| 2023/0047560 | A1 | 2/2023 | Saeki |
| 2023/0116451 | A1 | 4/2023 | Uratani |
| 2023/0119795 | A1 | 4/2023 | Saeki |

* cited by examiner

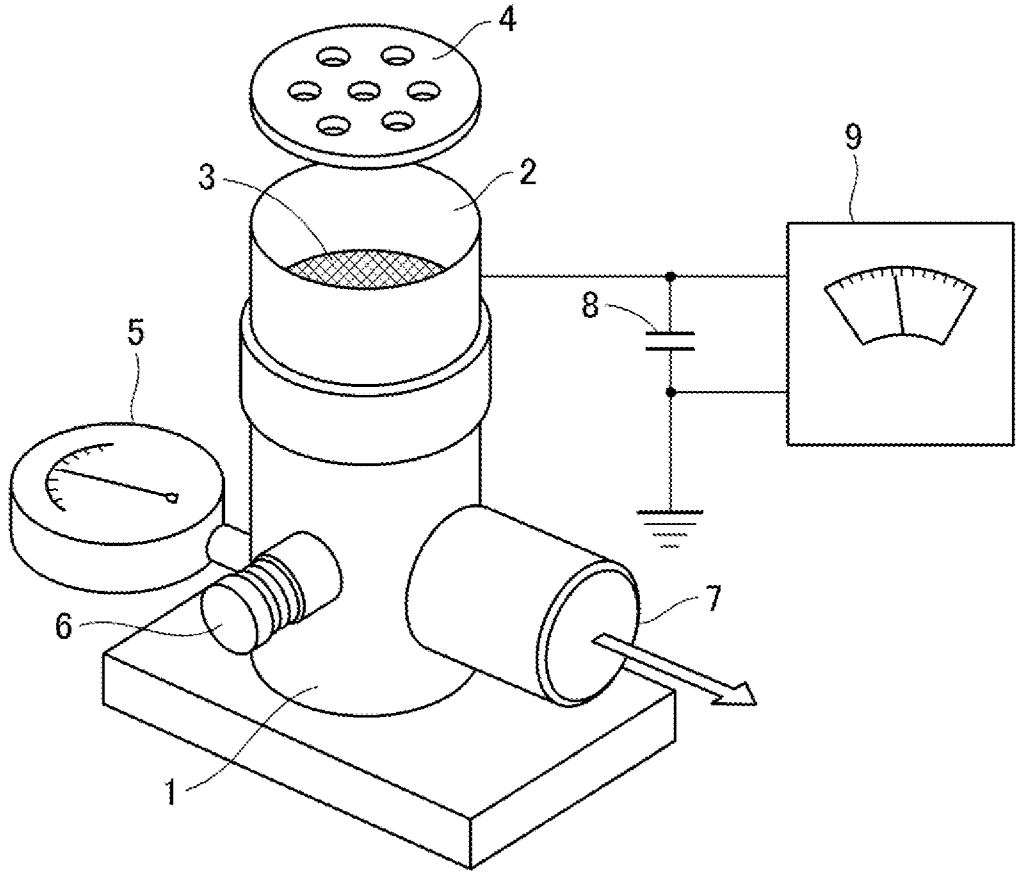
4
9
3
2
8
5
6
7
1

TONER AND METHOD FOR PRODUCING TONER

BACKGROUND OF THE INVENTION

Field of the Invention

The present disclosure relates to: a toner for developing electrostatic images in image-forming methods such as electrophotography and electrostatic printing; and a method for producing the toner.

Description of the Related Art

In recent years, demands have increased for lower energy consumption by copiers and printers, and attempts have been made to achieve lower energy consumption by lowering fixation temperature in particular. There have been demands for low-temperature fixability in toners so that fixing is possible at lower temperatures.

Use of a crystalline material in a binder resin has been proposed as one example of a means for improving low-temperature fixability. Japanese Patent Application Publication No. 2019-159001 proposes a toner having excellent low-temperature fixability through use of a crystalline polyester resin having excellent sharp melt properties in a binder resin.

However, in cases where low-temperature fixability is improved, problems can occur, such as storage properties of a toner deteriorating, heat-resistant storage stability during transport deteriorating, and filming occurring on printer components. Moreover, there has been a proposal for a toner having a core-shell structure in order to achieve a balance between low-temperature fixability and storage properties. Japanese Translation of PCT Application No. 2015-506494 proposes a toner which has a core-shell structure and in which a borax coupling agent is contained between the core and the shell.

SUMMARY OF THE INVENTION

However, hot offset tends to occur in a case where the content of a crystalline polyester resin is increased in order to further improve low-temperature fixability in the invention disclosed in Japanese Patent Application Publication No. 2019-159001. In addition, in a case where a crystalline polyester resin is incorporated in the invention disclosed in Japanese Translation of PCT Application No. 2015-506494, non-uniformity of penetration into a recording material can occur as a result of a crystalline polyester resin melting at the time of fixing, and hot offset occurs. The present disclosure provides: a toner which exhibits excellent low-temperature fixability and suppresses non-uniformity of penetration into a recording paper and hot offset; and a method for producing the toner.

The present disclosure relates to a toner comprising:

a toner particle comprising a binder resin and boric acid; wherein the binder resin comprises an amorphous resin and a crystalline polyester resin, a content of the crystalline polyester resin in the toner is 30.00 to 80.00 mass %, and a content of the boric acid in the toner is 0.10 to 10.00 mass %.

Also, the present disclosure relates to a toner production method for producing a toner comprising a toner particle comprising a binder resin and boric acid, wherein the binder resin comprises an amorphous resin and a crystalline polyester resin, the toner production method comprises steps (1) to (3) below (1) a mixing step for mixing a dispersed solution of amorphous resin fine particles containing the amorphous resin with a dispersed solution of crystalline polyester resin fine particles containing the crystalline polyester resin, (2) an aggregation step for aggregating fine particles contained in the dispersed solution of the amorphous resin fine particles and the dispersed solution of the crystalline polyester resin fine particles so as to form aggregates, and (3) a fusion step for heating and fusing the aggregates, boric acid is present in the aggregates in the fusion step (3), a content of the crystalline polyester resin in the toner is 30.00 to 80.00 mass %, and a content of the boric acid in the toner is 0.10 to 10.00 mass %.

Also, the present disclosure relates to a toner production method for producing a toner comprising a toner particle comprising a binder resin and boric acid, wherein the binder resin comprises an amorphous resin and a crystalline polyester resin, the toner production method comprises steps (1) to (3) below (1) a mixing step for mixing a dispersed solution of amorphous resin fine particles containing the amorphous resin with a dispersed solution of crystalline polyester resin fine particles containing the crystalline polyester resin, (2) an aggregation step for aggregating fine particles contained in the dispersed solution of the amorphous resin fine particles and the dispersed solution of the crystalline polyester resin fine particles so as to form aggregates, and (3) a fusion step for heating and fusing the aggregates, the toner production method has a step for adding borax in at least one of the steps (1) to (3), a content of the crystalline polyester resin in the toner is 30.00 to 80.00 mass %, and a content of the boric acid in the toner is 0.10 to 10.00 mass %.

According to the present disclosure, it is possible to obtain a toner which exhibits excellent low-temperature fixability and suppresses non-uniformity of penetration into a recording paper and hot offset.

Further features of the present invention will become apparent from the following description of exemplary embodiments with reference to the attached drawings.

BRIEF DESCRIPTION OF THE DRAWINGS

The FIGURE is an example of an apparatus for measuring triboelectric charge quantity.

DESCRIPTION OF THE EMBODIMENTS

In the present disclosure, the terms “from XX to YY” and “XX to YY”, which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

As mentioned above, there are means for increasing the content of a crystalline polyester resin in order to improve low-temperature fixability, but non-uniformity of penetration into a recording material and hot offset can occur. Therefore, toners in which the content of a crystalline polyester resin has been suppressed to a level at which these problems do not occur have been designed. Moreover, "hot offset" means that because the temperature of a heat roller is too high, a part of a toner image adheres to the surface of a component of a fixing unit and is fixed on a recording material in the next cycle.

As a result of diligent research carried out in order to solve these problems, the inventors of the present invention found that the problems mentioned above could be solved by controlling the content of a crystalline polyester resin and the content of boric acid to appropriate levels in a toner containing an amorphous resin, the crystalline polyester resin and boric acid.

The present disclosure relates to a toner comprising:

a toner particle comprising a binder resin and boric acid; wherein the binder resin comprises an amorphous resin and a crystalline polyester resin, a content of the crystalline polyester resin in the toner is 30.00 to 80.00 mass %, and a content of the boric acid in the toner is 0.10 to 10.00 mass %.

Boric acid is represented by the formula $B(OH)_3$, and has hydroxyl groups. If a combination of a crystalline polyester resin and boric acid is used, it is thought that hydrogen bonding occurs between hydroxyl groups in the boric acid and ester groups in the crystalline polyester resin. Because the toner melts and deforms at the time of fixing in particular, it is thought that because the boric acid diffuses in the toner when the folded structure of the main chain of the crystalline polyester resin loosens, a state is attained in which the boric acid and the crystalline polyester resin become sufficiently mixed and hydrogen bonding is more readily formed. As a result, because the sharp melt properties of the crystalline polyester resin are maintained and excess melting of the crystalline polyester resin is suppressed even at a high temperature, hot offset resistance is improved even if the temperature of a heat roller is high.

In addition, in a case where the content of a crystalline polyester resin is high in a toner, sharp melt properties are generally excellent, but the toner tends to be more affected by the state of heating of a recording material at the time of fixing. That is, because there is a partial temperature difference in a single recording material at the time of fixing, non-uniformity of penetration into a recording material occurs, and gloss non-uniformity therefore occurs. However, because the toner mentioned above achieves a prominent effect because mixing of the crystalline polyester resin and the boric acid in the inner part of the toner is facilitated as the temperature increases, it is possible to reduce the effect of the temperature difference in the recording material and suppress gloss non-uniformity.

These advantageous effects are newly achieved by incorporating appropriate amounts of the crystalline polyester resin and boric acid in the toner. Gloss non-uniformity is a problem that occurs even if the content of the crystalline polyester resin is low, and the advantageous effects mentioned above cannot be achieved because the speed of mixing with boric acid at the time of fixing is slow if, for example, the content of an amorphous polyester resin is high.

In addition, the inventors of the present invention think that heat-resistant storage stability is improved because it is possible to suppress movement of molecules of a low melting point component that reduces heat-resistant storage stability because hydrogen bonding occurs between the crystalline polyester resin and the boric acid even if the toner is stored at a temperature close to room temperature.

The content of boric acid in the specific toner is from 0.10 mass % to 10.00 mass %. If this content is less than 0.10 mass %, the advantageous effect of suppressing excess melting of the crystalline polyester resin cannot be achieved and hot offset and gloss non-uniformity occur. If this content exceeds 10.00 mass %, pseudo-crosslinking progresses as a result of hydrogen bonding with the crystalline polyester resin, and sharp melt properties cannot be achieved. In addition, the state in which the boric acid is present in the inner part of the toner becomes non-uniform, and gloss non-uniformity occurs.

The content of boric acid in the toner is preferably from 1.00 mass % to 9.00 mass %. The content of boric acid in the toner is more preferably from 2.00 mass % to 8.00 mass %.

The content of the crystalline polyester resin in the toner is from 30.00 mass % to 80.00 mass %. Because the amount of crystalline resin is low if the content of the crystalline polyester resin is less than 30.00 mass %, sufficient sharp melt properties cannot be achieved, and because mixing with the boric acid does not progress sufficiently at the time of fixing, gloss non-uniformity occurs. If the content of the crystalline polyester resin exceeds 80.00 mass %, hydrogen bonding with the boric acid occurs in only a part of the crystalline polyester resin, fixing occurs before sufficient hydrogen bonding occurs, and hot offset and gloss non-uniformity occur. Charging performance and durability also decrease. The content of the crystalline polyester resin in the toner is preferably from 30.00 mass % to 70.00 mass %, and more preferably from 40.00 mass % to 60.00 mass %.

In addition, if the content of the boric acid in the toner is represented by X mass % and the content of the crystalline polyester resin in the toner is represented by Y mass %, the ratio of X relative to Y (X/Y) is preferably from 0.025 to 0.170. By setting the ratio of the boric acid and the crystalline polyester resin to fall within the range mentioned above, balanced hydrogen bonding between the boric acid and the crystalline polyester resin at the time of fixing is further improved, low-temperature fixability and hot offset resistance are further improved, and gloss non-uniformity can be better suppressed. The value of X/Y is more preferably from 0.040 to 0.130.

The boric acid may be present in the toner particle as unsubstituted boric acid, and may be used in the form of an organic boric acid, a boric acid salt, a boric acid ester, or the like, at a stage where the boric acid is used as a raw material.

In a case where the toner is produced in an aqueous medium, the boric acid is preferably added as a boric acid salt from the perspectives of reactivity and production stability, with specific examples thereof including sodium tetraborate and ammonium borate, and it is particularly preferable to use borax. Because borax is sodium tetraborate ($Na_2B_4O_7$) decahydrate and is converted into boric acid in acidic aqueous solutions, it is preferable to use borax in a case where the boric acid is used in an acidic environment in an aqueous medium.

The toner preferably has a core-shell structure having a core particle that contains the crystalline polyester resin and a shell containing an amorphous resin at the surface of the core particle. By having a core-shell structure, the amount of crystalline polyester resin exposed at the particle surface decreases, contamination of members by low melting point components of the crystalline polyester resin in particular is suppressed, and durability is therefore improved. The core particle may contain an amorphous resin in addition to the crystalline polyester resin. The core particle preferably contains a crystalline polyester resin and an amorphous resin.

The mass ratio of the core particle and the shell is preferably 70:30 to 95:5, and more preferably 80:20 to 95:5. Within this range, sufficient low-temperature fixability can be achieved as a result of sharp melt properties, which are a property of the crystalline polyester resin. The shell does not necessarily need to coat the whole of the core particle, and a part of the core particle may be exposed.

It is more preferable for the core particle of the toner particle to contain boric acid. Because boric acid is present in the inner part of the core particle, hydrogen bonding with the crystalline polyester resin tends to be more readily formed, hot offset resistance and durability are further improved, and gloss non-uniformity can be better suppressed.

Binder Resin

The toner contains a binder resin, and the binder resin contains an amorphous resin and a crystalline polyester resin. By incorporating the amorphous resin in addition to the crystalline polyester resin, contamination of members is prevented.

Amorphous Resin

There are no particular limitations on the amorphous resin, and it can be exemplified by styrene-acrylic resins, epoxy resins, polyester resins, polyurethane resins, polyamide resins, cellulosic resins, and polyether resins and by mixed resins and composite resins of the preceding. Styrene-acrylic resins and polyester resins are preferred in view of their low cost, ease of acquisition, and excellent low-temperature fixability. Polyester resins are more preferred.

The polyester resins are obtained by synthesis, using a heretofore known method such as, for example, transesterification or polycondensation, from a combination of suitable selections from, e.g., polybasic carboxylic acids, polyols, hydroxycarboxylic acids, and so forth.

A polycarboxylic acid is a compound having two or more carboxyl groups per molecule. Of these, a dicarboxylic acid is a compound having two carboxyl groups per molecule, and is preferably used.

Examples thereof include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

In addition, examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having two or more hydroxyl groups per molecule. Of these, a diol is a compound having two hydroxyl groups per molecule, and is preferably used.

Specific examples include ethylene glycol, diethylene glycol, triethylene glycol, 1,2-propane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred. A compound represented by formula (A) below can be given as an example of an alkylene oxide adduct of bisphenol A.

(A)

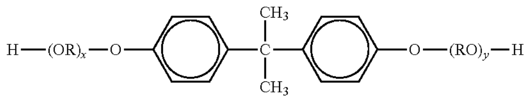

(In formula (A), R moieties are each independently an ethylene group or a propylene group, x and y are each an integer of 0 or more, and the average value of x+y is from 0 to 10.)

The alkylene oxide adduct of bisphenol A is preferably a propylene oxide adduct and/or ethylene oxide adduct of bisphenol A. A propylene oxide adduct is more preferred. In addition, the average value of x+y is preferably from 1 to 5.

Examples of trihydric or higher alcohols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher alcohols in isolation or a combination of two or more types thereof.

The glass transition temperature (Tg) of the amorphous resin preferably falls within the range 40° C. to 75° C. The content of the amorphous resin in the toner is preferably from 10.00 mass % to 60.00 mass %, more preferably from 15.00 mass % to 50.00 mass %, and further preferably from 15.00 mass % to 45.00 mass %.

Crystalline Polyester Resin

The crystalline polyester resin is a polyester resin that exhibits crystallinity, and has a clear endothermic peak on an endothermic curve obtained using differential scanning calorimetric measurements (DSC), that is, has a melting point.

More specifically, the crystalline polyester resin is one having a peak for which the half value width is 15° C. or less on an endothermic curve obtained when the temperature is increased at a temperature increase rate of 10° C./min. In addition, the amorphous resin is a resin that does not have a melting point on the endothermic curve mentioned above.

The crystalline polyester resin is preferably a condensation polymer of, for example, a divalent or higher polycarboxylic acid and a dihydric or higher polyhydric alcohol. From the perspectives of being able to achieve a desired melting point and exhibiting high crystallinity, a crystalline polyester resin obtained using an aliphatic dicarboxylic acid and an aliphatic diol as primary raw materials is preferred, and a condensation polymer of an aliphatic dicarboxylic acid and an aliphatic diol is more preferred.

Examples of polyhydric alcohols include ethylene glycol, diethylene glycol, triethylene glycol, 1,2-propane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,15-pentadecane diol, 1,16-hexadecane diol, dipropylene glycol, tetramethylene glycol, pentamethylene glycol, hexamethylene glycol, octamethylene glycol, nonamethylene glycol, decamethylene glycol, dodecamethylene glycol, neopentyl glycol and 1,4-butadiene glycol.

At least one monomer selected from the group consisting of α,ω-straight chain aliphatic diols having from 2 to 16 carbon atoms is preferred.

Examples of polycarboxylic acids include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, tridecanedicarboxylic acid, tetradecanedicarboxylic acid, pentadecanedicarboxylic acid, hexadecanedicarboxylic acid, heptadecanedicarboxylic acid, octadecanedicarboxylic acid, maleic acid, fumaric acid, mesaconic acid, citraconic acid, itaconic acid, isophthalic acid, terephthalic acid, n-dodecylsuccinic acid, n-dodecenylsuccinic acid, cyclohexanedicarboxylic acid, and anhydrides and lower alkyl esters of these acids.

At least one monomer selected from the group consisting of α,ω-straight chain aliphatic dicarboxylic acids having from 2 to 14 carbon atoms and anhydrides and lower alkyl esters of these acids is preferred.

Methods for obtaining the crystalline polyester resin include: a method comprising dividing the monomers into batches, condensing one batch to a certain extent, and then adding the remaining monomers and condensing again; and a method comprising synthesizing a crystalline polyester resin having a low molecular weight and a crystalline polyester resin having a high molecular weight, and then melting and mixing these resins at a ratio such that a desired molecular weight distribution is attained.

The weight average molecular weight Mw of the crystalline polyester resin is preferably 12,000 to 45,000, and more preferably 15,000 to 25,000. This range is preferred from the perspective of low-temperature fixability because dispersibility in the toner particle and the viscosity at time of melting are excellent.

In addition, from the perspectives of developing performance and fixing performance, the melting point of the crystalline polyester resin is preferably from 55.0° C. to 90.0° C., and more preferably from 60.0° C. to 80.0° C.

The crystalline polyester resin has a crystalline polyester segment, and the ester group concentration in the crystalline polyester segment, as defined using the formula below, is preferably from 3.50 mmol/g to 10.00 mmol/g.

[Ester group concentration (mmol/g)]=[number of moles of ester groups in crystalline polyester segment]/[molecular weight of crystalline polyester segment]

Within the range mentioned above, interactions between the crystalline polyester resin and the borax effectively take place and hot offset resistance is further improved. This is thought to be because boric acid is more readily introduced into the folded structure of the main chain of the crystalline polyester resin. The ester group concentration is more preferably from 4.00 mmol/g to 8.00 mmol/g. Moreover, in a case where the crystalline polyester resin is a block polymer described below, the ester group concentration in the crystalline polyester segment preferably falls within the range mentioned above. The crystalline polyester segment is a segment able to form a lamellar structure in the crystalline polyester resin. For example, the crystalline polyester segment can be formed from a condensation polymer of an aliphatic dicarboxylic acid and an aliphatic diol.

The crystalline polyester resin is preferably a block polymer containing a crystalline polyester segment and an amorphous polyester segment. In addition, the crystalline polyester segment preferably has a structure represented by formula (1) below. In formula (1), m represents an integer of 6 to 14, and n represents an integer of 6 to 16.

(1)

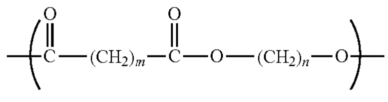

By forming the structure mentioned above, dispersibility of the crystalline polyester resin in the toner is improved, non-uniform distribution of the crystalline polyester resin is suppressed, and durability is therefore improved. In addition, charge leakage is suppressed and charging performance is improved.

The crystalline polyester segment preferably has, as a repeating unit, a structure in which a dicarboxylic acid having an alkyl group with 6 to 14 carbon atoms is condensed with a diol having an alkylene group with 6 to 16 carbon atoms. Moreover, the crystalline polyester segment is preferably such that the content of a structure derived from the repeating unit mentioned above is from 90 mass % to 100 mass % relative to the total mass of the crystalline polyester segment.

Moreover, the structure represented by formula (1) above can be obtained by condensing a dicarboxylic acid and a diol.

Adipic acid, suberic acid, sebacic acid, dodecanedioic acid, tetradecanedioic acid, hexadecanedioic acid, or the like, can be used as the dicarboxylic acid.

1,6-hexane diol, 1,7-heptane diol, 1,8-octane diol, 1,9-nonane diol, 1,10-decane diol, 1,12-dodecane diol, 1,14-tetradecane diol, 1,16-hexadecane diol, or the like, can be used as the diol.

The amorphous polyester segment will now be described.

A resin used for forming the amorphous polyester segment preferably has a weight average molecular weight (Mw) of from 4,000 to 15,000. This weight average molecular weight is more preferably from 8,000 to 13,000. If the Mw value falls within the range mentioned above, the strength of the resin increases, durability is improved, an increase in the viscosity of the crystalline polyester resin tends to be suppressed, and low-temperature fixability is therefore excellent. In addition, the resin used for forming the amorphous polyester segment preferably has a glass transition temperature (Tg) within the range 40.0 to 75.0° C.

Moreover, the resin used for forming the amorphous polyester segment can be a combination obtained by selecting appropriate substances from among the polycarboxylic acids, polyols, hydroxycarboxylic acids, and the like, listed for the polyester resin mentioned above. The method for producing the block polymer having the crystalline polyester segment and the amorphous polyester segment is not particularly limited, and a well-known method can be used. For example, the block polymer can be obtained by, for example, separately synthesizing the crystalline polyester resin and the amorphous polyester resin and then reacting these resins.

The mass ratio of the crystalline polyester segment and the amorphous polyester segment in the crystalline polyester resin (crystalline polyester segment:amorphous polyester segment) is preferably 40:60 to 95:5, and more preferably 45:55 to 80:20. Within this range, more satisfactory low-temperature fixability can be achieved as a result of sharp melt properties, which are a property of the crystalline polyester segment.

Release Agent

The toner particle may contain a wax as a release agent. Examples of the wax include the types listed below.

Hydrocarbon waxes such as low molecular weight polyethylene, low molecular weight polypropylene, alkylene copolymers, microcrystalline waxes, paraffin waxes and Fischer Tropsch waxes; oxides of hydrocarbon waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid and alcohols such as stearyl alcohol, aralkyl alcohols, behenyl alcohol, carnaubyl alcohol, ceryl alcohol and melissyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyladipic acid amide and N,N'-dioleylsebacic acid amide; aromatic bisamides such as m-xylene bis-stearic acid amide and N,N'-distearylisophthalic acid amide; fatty acid metal salts (commonly known as metal soaps) such as calcium stearate, calcium laurate, zinc stearate and magnesium stearate; waxes obtained by grafting vinyl monomers such as styrene and acrylic acid onto aliphatic hydrocarbon-based waxes; partial esters of fatty acids and polyhydric alcohols, such as behenic acid monoglyceride; and hydroxyl group-containing methyl ester compounds obtained by hydrogenating plant-based oils and fats.

Of these waxes, hydrocarbon waxes, such as paraffin waxes and Fischer Tropsch waxes, and fatty acid ester-based waxes, such as carnauba wax, are preferred from the perspectives of improving low-temperature fixability and fixing and separation performance. Hydrocarbon waxes are more preferred from the perspective of further improving high temperature offset resistance.

The wax content is preferably 3 to 20 parts by mass relative to 100 parts by mass of the binder resin. In addition, the peak temperature of the maximum endothermic peak of the wax on a rising temperature endothermic curve measured using a differential scanning calorimetric measurement (DSC) apparatus is preferably 45° C. to 140° C. If the peak temperature of the maximum endothermic peak of the wax falls within the range mentioned above, a better balance tends to be achieved between toner storability and hot offset resistance.

Colorant

The toner may contain a colorant if necessary. Examples of the colorant include those listed below.

Examples of black colorants include carbon black; and materials that are colored black through use of yellow colorants, magenta colorants and cyan colorants. The colorant may be only a pigment or a combination of a dye and a pigment. From the perspective of image quality of a full color image, it is preferable to use a combination of a dye and a pigment.

Examples of pigments for magenta toners include those listed below. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35. Examples of dyes for magenta toners include those listed below. Oil-soluble dyes such as C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39 and 40; and C.I. Basic Violet 1, 3, 7, 10, 14, 15, 21, 25, 26, 27 and 28.

Examples of pigments for cyan toners include those listed below. C.I. Pigment Blue 2, 3, 15:2, 15:3, 15:4, 16 and 17; C.I. Vat Blue 6; C.I. Acid Blue 45, and copper phthalocyanine pigments in which 1 to 5 phthalimidomethyl groups in the phthalocyanine skeleton are substituted. An example of a dye for a cyan toner is C.I. Solvent Blue 70. Examples of pigments for yellow toners include those listed below. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20. An example of a dye for yellow toner is C.I. Solvent Yellow 162.

These colorants can be used singly or as a mixture, and can be used in the form of solid solutions. These colorants are selected in view of hue angle, chroma, lightness, lightfastness, OHP transparency and dispersibility in the toner. The content of the colorant is preferably from 1.0 parts by mass to 20.0 parts by mass relative to 100.0 parts by mass of the binder resin.

Charge Control Agent

The toner particle may contain a charge control agent. A well-known charge control agent can be used. A charge control agent which has a fast charging speed and can stably maintain a certain charge quantity is particularly preferred.

Examples of charge control agents that impart the toner particle with negative chargeability include the compounds listed below.

Examples of organometallic compounds and chelate compounds include monoazo metal compounds, acetylacetone metal compounds, aromatic oxycarboxylic acids, aromatic dicarboxylic acids, and oxycarboxylic acid-based and dicarboxylic acid-based metal compounds. In addition, aromatic oxycarboxylic acids, aromatic monocarboxylic acids and polycarboxylic acids and metal salts, anhydrides and esters thereof, phenol derivatives such as bisphenol compounds, and the like, are also included. Further examples include urea derivatives, metal-containing salicylic acid-based compounds, metal-containing naphthoic acid-based compounds, boron compounds, quaternary ammonium salts and calixarene.

Meanwhile, examples of charge control agents that impart the toner particle with positive chargeability include the compounds listed below. Nigrosine and nigrosine-modified fatty acid metal salts; guanidine compounds; imidazole compounds; quaternary ammonium salts such as tributylbenzyl ammonium-1-hydroxy-4-naphthosulfonic acid salts, tetrabutyl ammonium tetrafluoroborate, and analogs thereof; onium salts such as phosphonium salts, and lake pigments thereof; triphenylmethane dyes and Lake pigments thereof (examples of laking agents include phosphotungstic acid, phosphomolybdic acid, phosphotungstic-molybdic acid, tannic acid, lauric acid, gallic acid, ferricyanic acid and ferrocyanic compounds); metal salts of higher fatty acids; and resin-based charge control agents.

It is possible to use one of these charge control agents in isolation, or a combination of two or more types thereof. The added amount of these charge control agents is preferably from 0.01 parts by mass to 10.00 parts by mass relative to 100.00 parts by mass of the binder resin.

Toner Production Method

The method for producing the toner is not particularly limited, and a well-known method such as a pulverization method, a dissolution suspension method, an emulsion aggregation method or a dispersion polymerization method can be used. In any of these toner particle production methods, it is preferable to obtain a toner particle by adding a boric acid source when mixing the raw materials. Here, the toner is preferably produced using the method described below. That is, the toner is preferably produced using an emulsion aggregation method.

The toner production method preferably includes steps (1) to (3) below:

(1) a mixing step for mixing a dispersed solution of amorphous resin fine particles containing the amorphous resin with a dispersed solution of crystalline polyester resin fine particles containing the crystalline polyester resin, (2) an aggregation step for aggregating fine particles contained in the dispersed solution of the amorphous resin fine particles and the dispersed solution of the crystalline polyester resin fine particles so as to form aggregates, and (3) a fusion step for heating and fusing the aggregates, and boric acid is present in the aggregates in the fusion step (3), the content of the crystalline polyester resin in the toner is from 30.00 mass % to 80.00 mass %, and the content of boric acid in the toner is from 0.10 mass % to 10.00 mass %.

A case where the toner is produced using an emulsion aggregation method is preferred because the boric acid tends to be homogeneously dispersed in the crystalline polyester resin and mixing of the crystalline polyester resin and the boric acid progresses throughout the entire toner particle at the time of fixing. Details of the emulsion aggregation method will now be described.

Emulsion Aggregation Method

An emulsion aggregation method is a method in which toner particles are produced by first preparing an aqueous dispersion liquid of fine particles which comprise the constituent materials of the toner particles and which are substantially smaller than the desired particle diameter, and then aggregating these fine particles in an aqueous medium until the particle diameter of the toner particles is reached, and then carrying out heating or the like so as to fuse the resin.

That is, in an emulsion aggregation method, a toner is produced by carrying out a dispersion step for producing fine particle-dispersed solutions comprising constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a cooling step thereafter; a metal removal step for filtering the obtained toner and removing excess polyvalent metal ions; a filtering/washing step for filtering the obtained toner and washing with ion exchanged water or the like; and a step for removing water from the washed toner and drying.

Step for Preparing Resin Fine Particle-Dispersed Solution (Dispersion Step)

A resin fine particle-dispersed solution can be prepared using a well-known method, but is not limited to such methods. Examples of well-known methods include an emulsion polymerization method, a self-emulsification method, a phase inversion emulsification method in which an aqueous medium is added to a resin solution dissolved in an organic solvent so as to emulsify the resin, or a forcible emulsification method in which a resin is subjected to a high temperature treatment in an aqueous medium without using an organic solvent so as to forcibly emulsify the resin.

Specifically, the binder resin is dissolved in an organic solvent that can dissolve these components, and a surfactant and a basic compound are added. In such cases, if the binder resin is a crystalline resin having a melting point, the resin should be melted by being heated to the melting point of the resin or higher. Next, resin fine particles are precipitated by slowly adding an aqueous medium while agitating by means of a homogenizer or the like. A resin fine particle-dispersed aqueous solution is then prepared by heating or lowering the pressure so as to remove the solvent. Any solvent able to dissolve the resins mentioned above can be used as the organic solvent used for dissolving the resin, but use of an organic solvent that forms a uniform phase with water, such as toluene, is preferred from the perspective of suppressing the generation of coarse particles.

The type of surfactant used in the emulsification mentioned above is not particularly limited, but examples thereof include anionic surfactants such as sulfate ester salts, sulfonic acid salts, carboxylic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants. It is possible to use one of these surfactants in isolation, or a combination of two or more types thereof.

Examples of the basic compound used in the dispersion step include inorganic bases such as sodium hydroxide and potassium hydroxide, and organic bases such as ammonia, triethylamine, trimethylamine, dimethylaminoethanol and diethylaminoethanol. It is possible to use one of these basic compounds in isolation, or a combination of two or more types thereof.

In addition, the 50% particle diameter on a volume basis (D50) of the binder resin fine particles in the resin fine particle-dispersed aqueous solution is preferably 0.05 μm to 1.0 μm, and more preferably 0.05 μm to 0.4 μm. By adjusting the 50% particle diameter (D50) on a volume basis within the range mentioned above, it is easy to obtain a toner particle having a diameter 3 μm to 10 μm, which is a suitable volume average particle diameter for the toner particle.

Moreover, a dynamic light scattering particle size distribution analyzer (Nanotrac UPA-EX150 produced by Nikkiso Co., Ltd.) was used to measure the 50% particle diameter on a volume basis (D50).

Colorant Fine Particle-Dispersed Solution

A colorant fine particle-dispersed solution, which is used according to need, can be prepared using a well-known method given below, but is not limited to such methods.

The colorant fine particle-dispersed solution can be prepared by mixing a colorant, an aqueous medium and a dispersing agent using a well-known mixing machine such as a stirring machine, an emulsifying machine or a dispersing machine. It is possible to use a well-known dispersing agent such as a surfactant or a polymer dispersing agent as the dispersing agent used in this case.

Whether the dispersing agent is a surfactant or a polymer dispersing agent, the dispersing agent can be removed by means of the washing step described below, but a surfactant is preferred from the perspective of washing efficiency.

Examples of the surfactant include anionic surfactants such as sulfate ester salts, sulfonic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants.

Of these, non-ionic surfactants and anionic surfactants are preferred. In addition, it is possible to use a combination of a non-ionic surfactant and an anionic surfactant. It is possible to use one of these surfactants in isolation, or a combination of two or more types thereof. The concentration of the surfactant in the aqueous medium is preferably 0.5 mass % to 5 mass %.

The content of colorant fine particles in the colorant fine particle-dispersed solution is not particularly limited, but is preferably 1 mass % to 30 mass % relative to the total mass of the colorant fine particle-dispersed solution.

In addition, the dispersed particle diameter of colorant fine particles in the colorant fine particle-dispersed aqueous solution is preferably such that the 50% particle diameter on a volume basis (D50) is 0.5 μm or less from the perspective of dispersibility of the colorant in the ultimately obtained toner. For similar reasons, the 90% particle diameter on a volume basis (D90) is preferably 2 μm or less. Moreover, the dispersed particle diameter of colorant fine particles in the colorant fine particle-dispersed solution is measured using a dynamic light scattering particle size distribution analyzer (Nanotrac UPA-EX150 produced by Nikkiso Co., Ltd.).

Examples of well-known mixing machines such as stirring machines, emulsifying machines and dispersing machines used when dispersing the colorant in the aqueous medium include ultrasonic homogenizers, jet mills, pressurized homogenizers, colloid mills, ball mills, sand mills and paint shakers. It is possible to use one of these mixing machines in isolation, or a combination thereof.

Dispersed Solution of Fine Particle of Release Agent (Aliphatic Hydrocarbon Compound)

A release agent fine particle-dispersed solution may be used if necessary. The release agent fine particle-dispersed solution can be prepared using the well-known method given below, but is not limited to this well-known method.

The release agent fine particle-dispersed solution can be prepared by adding a release agent to an aqueous medium containing a surfactant, heating to a temperature that is not lower than the melting point of the release agent, dispersing in a particulate state using a homogenizer having a strong shearing capacity (for example, a "Clearmix W-Motion" produced by M Technique Co., Ltd.) or a pressure discharge type dispersing machine (for example, a "Gaulin homogenizer" produced by Gaulin), and then cooling to a temperature that is lower than the melting point of the release agent.

In addition, the dispersed particle diameter of the release agent fine particle-dispersed solution in the aqueous dispersion of the release agent is such that the 50% particle diameter on a volume basis (D50) is preferably 0.03 μm to 1.0 μm, and more preferably 0.1 μm to 0.5 μm. In addition, it is preferable for coarse wax particles having diameters of at least 1 μm not to be present.

If the dispersed particle diameter in the release agent fine particle-dispersed solution falls within the range mentioned above, the release agent can be finely dispersed in the toner, an outmigration effect can be exhibited to the maximum possible extent at the time of fixing, and good separation properties can be achieved. Moreover, the dispersed particle diameter of the release agent fine particle-dispersed solution dispersed in the aqueous medium can be measured using a dynamic light scattering particle size distribution analyzer (a Nanotrac UPA-EX150 produced by Nikkiso Co., Ltd.).

Mixing Step

In the mixing step, a mixed liquid is prepared by mixing the resin fine particle-dispersed solution and, if necessary, at least one of the release agent fine particle-dispersed solution and the colorant fine particle-dispersed solution. It is possible to use a well-known mixing apparatus, such as a homogenizer or a mixer.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant and applying heat and/or a mechanical force as appropriate if necessary, aggregates are formed through aggregation of resin fine particles and, if necessary, release agent fine particles and/or colorant fine particles.

Examples of flocculants include organic flocculants, such as quaternary salt type cationic surfactants and polyethyleneimines; and inorganic flocculants, such as inorganic metal salts such as sodium sulfate, sodium nitrate, sodium chloride, calcium chloride and calcium nitrate; inorganic ammonium salts such as ammonium sulfate, ammonium chloride and ammonium nitrate; and divalent or higher metal complexes. In addition, an acid may be added in order to lower the pH and effect soft aggregation, and sulfuric acid, nitric acid, or the like, can be used.

The flocculant may be added in the form of a dry powder or an aqueous solution dissolved in an aqueous medium, but adding the flocculant in the form of an aqueous solution is preferred in order to bring about uniform aggregation. In addition, it is preferable for the flocculant to be added and mixed at a temperature that is not higher than the glass transition temperature or melting point of the resin contained in the mixed solution. By mixing under these temperature conditions, aggregation progresses relatively uniformly. When mixing the flocculant in the mixed solution, it is possible to use a well-known mixing apparatus, such as a homogenizer or a mixer. The aggregation step is a step in which toner particle-sized aggregates are formed in the aqueous medium. The volume average particle diameter of aggregates produced in the aggregation step is preferably 3 μm to 10 μm. The volume average particle diameter can be measured using a particle size distribution analyzer that uses the Coulter principle (a Coulter Multisizer III: produced by Beckman Coulter, Inc.).

Step for Obtaining Dispersed Solution Containing Toner Particles (Fusion Step)

In the fusion step, aggregation is first stopped in the dispersed solution containing aggregates obtained in the aggregation step while agitating in the same way as in the aggregation step. The aggregation is stopped by adding an aggregation-stopping agent able to adjust the pH, such as a base, a chelate compound or an inorganic compound such as sodium chloride.

After the dispersed state of aggregated particles in the dispersed solution has stabilized as a result of the action of the aggregation-stopping agent, the aggregated particles are fused and a desired particle diameter is achieved by being heated to a temperature that is not lower than the glass transition temperature or melting point of the binder resin. Moreover, the 50% particle diameter on a volume basis (D50) of the toner particles is preferably 3 μm to 10 μm.

Cooling Step

If necessary, the temperature of the dispersed solution containing the toner particles obtained in the fusion step is lowered in the cooling step to a temperature that is lower than the crystallization temperature and/or glass transition temperature of the binder resin. By cooling to a temperature that is lower than the crystallization temperature and/or the glass transition temperature, it is possible to prevent coarse particles from being generated. A specific cooling rate can be 0.1° C./min to 50° C./min.

Post-Treatment Steps

In the toner production method, post-treatment steps such as a washing step, a solid-liquid separation step and a drying step may be carried out after the cooling step, and toner particles can be obtained in a dry state by carrying out these post-treatment steps.

External Addition Step

Obtained toner particles may be used as-is as a toner.

In the external addition step, inorganic fine particles are, if necessary, externally added to the toner particles obtained in the drying step. Specifically, it is preferable to add inorganic fine particles such as silica or fine particles of a resin such as a vinyl resin, a polyester resin or a silicone resin while applying a shearing force in a dry state.

Boric acid is preferably present in steps (1) to (3) below in the toner production method. The toner production method preferably has a step for adding a boric acid source (preferably borax) in any one of steps (1) to (3). More preferably, the boric acid source is added and mixed in step (1).

(1) a mixing step for mixing a dispersed solution of amorphous resin fine particles containing the amorphous resin with a dispersed solution of crystalline polyester resin fine particles containing the crystalline polyester resin, (2) an aggregation step for aggregating fine particles contained in the dispersed solution of the amorphous resin fine particles and the dispersed solution of the crystalline polyester resin fine particles so as to form aggregates, and (3) a fusion step for heating and fusing the aggregates.

Moreover, the boric acid source may be added during the aggregation step.

The boric acid source may be boric acid or a compound that can be converted into boric acid by, for example, controlling the pH during production of the toner. For example, it is possible to add a boric acid source and control the process so that boric acid is contained in the aggregates in at least step (3).

The boric acid may be present in an un-substituted form in the aggregates. The boric acid source is preferably at least one substance selected from the group consisting of an organic boric acid, a boric acid salt, a boric acid ester, and the like. In a case where the toner is produced in an aqueous medium, it is preferable to add the boric acid as a boric acid salt from the perspectives of reactivity and production stability. Specifically, the boric acid source is more preferably at least one substance selected from the group consisting of sodium tetraborate, ammonium borate, and the like, and is further preferably borax.

Because borax is sodium tetraborate ($Na_2B_4O_7$) decahydrate and is converted into boric acid in acidic aqueous solutions, it is preferable to use borax in a case where the boric acid is used in an acidic environment in an aqueous medium. The method of addition may comprise adding the borax in the form of a dry powder or an aqueous solution dissolved in an aqueous medium, but adding the borax in the form of an aqueous solution is preferred in order to bring about uniform aggregation.

Borax may be added in any of steps (1) to (3). Borax is preferably added and mixed in the mixing step (1). Borax is more preferably added and mixed in the mixing step (1) so as to render the dispersed solutions acidic. The concentration of the aqueous solution should be altered, as appropriate, according to the concentration to be contained in the toner, and is, for example, 1 to 20 mass %. In order to convert the borax into boric acid, it is preferable to attain acidic pH conditions before the mixing, during the mixing or after the addition. For example, the pH should be regulated to 1.5 to 5.0, and preferably 2.0 to 4.0.

Analysis

Separation of Crystalline Polyester Resin and Measurement of Content of Crystalline Polyester Resin in Toner The toner is placed in a chloroform, allowed to rest for several hours at 25° C., vigorously shaken, and then allowed to rest for a further 12 hours or more until no sample agglomerates remain. The obtained solution is subjected to silica gel chromatography so as to remove a crystalline polyester component, and this component is recovered and dried.

The crystalline polyester component is isolated by using chloroform, hexane, methanol, or the like as a developing solvent, and adjusting the mixing ratio. The content of the crystalline polyester resin is calculated from the mass of the obtained crystalline polyester resin.

Calculation of Ester Group Concentration in Crystalline Polyester Segment of Crystalline Polyester Resin The ester group concentration indicates the proportion of ester groups in the crystalline polyester, and is defined using the following formula.

[Ester group concentration]=([number of ester groups in crystalline polyester segment per 1 mol (ester groups/mol)]×1000)/[molecular weight of crystalline polyester segment (g/mol)].

Polyester resins are generally obtained by a reaction between a polycarboxylic acid and a polyhydric alcohol, and an ester bond is formed through dehydrating condensation between a carboxyl group in the polycarboxylic acid and a hydroxyl group in the polyhydric alcohol. The number of ester groups in the crystalline polyester segment and the molecular weight of the crystalline polyester segment in the formula above are determined from the number of carboxyl groups in the polycarboxylic acid and the number of hydroxyl groups in the polyhydric alcohol when the crystalline polyester is synthesized. More specifically, if the polycarboxylic acid is a dicarboxylic acid represented by formula (I) and the polyhydric alcohol is a dihydric alcohol represented by formula (II), a crystalline polyester obtained from the compound of formula (I) and the compound of formula (II) is represented by formula (III).

$$HOOC—R^1—COOH \quad (I)$$

$$HO—R^2—OH \quad (II)$$

$$(—OCO—R^1—COO—R^2—)_n- \quad (III)$$

$R^1$ and $R^2$ are arbitrary hydrocarbon groups and, for example, $R^1$ is a straight chain alkylene group having 6 to 14 carbon atoms and $R^2$ is a straight chain alkylene group having 6 to 16 carbon atoms.

The number of ester groups in the compound of formula (III) above is the average of the number of carboxyl groups in the carboxylic acid of formula (I) above and the number of hydroxyl groups in the compound of formula (II) above, and is 2.

In addition, if the molecular weight of the compound of formula (I) above is represented by m1 and the molecular weight of the compound of formula (II) above is represented by m2, the molecular weight m3 of the compound of formula (III) above is m1+m2-18×(average of number of carboxyl groups and number of hydroxyl groups)=m3.

Therefore, the ester group concentration in the compound of formula (III) above is such that [ester group concentration]=(average of number of carboxyl groups and number of hydroxyl groups)/m3.

In addition, in a case where two or more polycarboxylic acids and two or more polyhydric alcohols are used in combination, the ester group concentration should be calculated from the average of the number of carboxyl groups and the average of the molecular weights of the respective polycarboxylic acids and the average of the number of hydroxyl groups and the average of the molecular weights of the respective polyhydric alcohols.

Furthermore, in order to determine the ester group concentration from the crystalline resin, this can be calculated from, for example, 1H-NMR (nuclear magnetic resonance) measurements using deuterated chloroform. More specifically, the ester group concentration is calculated from the ratio of a hydrogen atom peak derived from carbon in an alkyl moiety and a hydrogen atom peak derived from carbon adjacent to an ester group. The crystalline polyester is extracted from the toner in order to measure the peak top temperature of an endothermic peak, the ester group concentration, the content, and so on, from the crystalline polyester contained in the toner. The crystalline polyester can be extracted from the toner using the method described above.

Measurement of Weight Average Molecular Weight (Mw) and Number Average Molecular Weight (Mn) of Toner or Resin The molecular weight of the toner, resin, or the like, is measured by means of gel permeation chromatography (GPC) using the procedure described below.

First, a sample such as the toner is dissolved in tetrahydrofuran (THF) at room temperature. A sample solution is then obtained by filtering the obtained solution using a solvent-resistant membrane filter having a pore diameter of 0.2 μm (a “Mishoridisk” produced by Tosoh Corporation). Moreover, the sample solution is adjusted so that the concentration of THF-soluble components is 0.8 mass %. Measurements are carried out using this sample solution under the following conditions.

Apparatus: High speed GPC apparatus (HLC-8220GPC produced by Tosoh Corporation)
Column: Two LF-604 connected in series (produced by Showa Denko Kabushiki Kaisha)
Eluant: THF
Flow rate: 0.6 mL/min
Oven temperature: 40° C.
Injected amount of sample: 0.020 mL When calculating the molecular weight of the sample, a molecular weight calibration curve is prepared using standard polystyrene resins (product names “TSK Standard Polystyrene F-850, F-450, F-288, F-128, F-80, F-40, F-20, F-10, F-4, F-2, F-1, A-5000, A-2500, A-1000 and A-500”, produced by Tosoh Corporation).

Measurement of Content of Boric Acid in Toner

Identification and content measurement of boric acid contained in the toner are carried out using the following method.

Whether or not a toner contains boric acid can be confirmed using an infrared absorption spectrum. Specifically, a suitable amount of a sample resin of a toner or toner particle is mixed with potassium bromide (KBr) and molded. An infrared absorption spectrum is measured using this. Because a boric acid vibration is present at an absorption wavelength of 1380 $cm^{-1}$, it is possible to confirm the presence of boric acid.

In addition, it is possible to confirm whether or not boron derived from boric acid is present in an observed cross section by carrying out elemental analysis by means of energy dispersive X-Ray spectroscopy (EDX) using a transmission electron microscope (TEM).

When the content of boric acid contained in the toner is measured, fluorescence X-Ray measurements are carried out, and the content is determined using a calibration curve. More specifically, an aluminum ring (internal diameter 40 mm, external diameter 43 mm, height 5 mm) is placed on a sample molding die of a semi-automatic MiniPress machine (produced by Specac). A measurement pellet was produced by placing 3 g of toner in this ring and press molding for 1 minute at a pressure of 15 t. A molded pellet having a thickness of approximately 3 mm and a diameter of approximately 40 mm is used. Measurements are carried out under the following conditions using a wavelength-dispersive X-Ray fluorescence analysis apparatus (Axios produced by PANalytical) and dedicated software for this apparatus (SuperQ ver.4.0F produced by PANalytical) in order to set measurement conditions and analyze measured data. Rh is used as the X-Ray bulb anode, the measurement atmosphere is a vacuum, the measurement diameter (collimator mask diameter) is 27 mm, and the measurement time is 10 seconds. In addition, detection is carried out using a proportional counter (PC) in the case of boron.

The accelerating voltage of the X-Ray generator is 32 kV, and the current is 125 mA.

Measurements are carried out under the conditions described above, boron is identified on the basis of obtained X-Ray peak position, and count rate (units: cps), which is the number of X-Ray photons per unit time, is measured. In addition, the amount (mass %) of boric acid in the toner is determined from a separately prepared boric acid calibration curve.

In order to eliminate effects caused by external additives, measurements can, if necessary, be carried out using toner particles obtained by removing external additives from the toner using the following method.

A concentrated sucrose solution is prepared by adding 160 g of sucrose (produced by Kishida Chemical Co., Ltd.) to 100 mL of ion exchanged water and dissolving the sucrose while immersing in hot water. 31 g of the concentrated sucrose solution and 6 mL of Contaminon N (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) are placed in a centrifugal separation tube (capacity 50 mL). 1.0 g of toner is added to this and lumps of the toner are broken into smaller pieces using a spatula or the like. The centrifugal separation tube is shaken for 20 minutes at a rate of 300 spm (strokes per min) using a shaker (AS-1N produced by As One Corporation). Following the shaking, the solution is transferred to a (50 mL) swing rotor glass tube and subjected to separation for 30 minutes at 3500 rpm using a centrifugal separator (an H-9R, produced by Kokusan Co., Ltd.).

Toner particles are separated from external additives in this procedure. It is confirmed by visual inspection that toner particles are sufficiently separated from the aqueous solution, and toner particles separated into the uppermost layer are collected using a spatula or the like. A measurement sample is obtained by filtering the collected toner particles using a vacuum filtration device and then drying for 1 hour or longer using a dryer. This procedure is carried out multiple times in order to ensure the required amount.

Method for Measuring Melting Point and Half Value Width of Crystalline Polyester Resin The melting point and half value width of the crystalline polyester resin are measured using a DSC Q1000 (produced by TA Instruments) under the following conditions.

Temperature increase rate: 10° C./min

Measurement start temperature: 20° C.

Measurement end temperature: 180° C.

Temperature calibration of the detector in the apparatus is performed using the melting points of indium and zinc, and heat amount calibration is performed using the heat of fusion of indium. Specifically, 5 mg of a sample is precisely weighed out, placed in an aluminum pan, and subjected to differential scanning calorimetric measurements. An empty silver pan is used as a reference. The melting point (° C.) is taken to be the peak temperature of the maximum endothermic peak in a first temperature increase step. The half value width is a value calculated automatically by analysis software. Moreover, in a case where a plurality of peaks are present, the half value width is determined using the peak having the highest endothermic quantity.

Method for Measuring Glass Transition Temperature Tg of Amorphous Resin

The glass transition temperature Tg is measured using a "Q2000" differential scanning calorimeter (produced by TA Instruments). Temperature calibration of the detector in the apparatus is performed using the melting points of indium and zinc, and heat amount calibration is performed using the heat of fusion of indium. Specifically, 5 mg of a sample is precisely weighed out and placed in an aluminum pan, an empty aluminum pan is used as a reference, and measurements are carried out at a temperature increase rate of 10° C./min.

A change in specific heat is determined within the temperature range of 40° C. to 100° C. in a temperature increase step. Here, the glass transition temperature of the resin is deemed to be the point at which the differential thermal analysis curve intersects with the line at an intermediate point on the baseline before and after a change in specific heat occurs.

Measurement of Particle Diameter of Toner Particle

The particle diameter of the toner particle can be measured using a pore electrical resistance method. For example, measurements and calculations can be carried out using a "Coulter Counter Multisizer 3" and accompanying software (Beckman Coulter Multisizer 3 Version 3.51 produced by Beckman Coulter, Inc.).

An apparatus for precisely measuring particle size distribution by means of a pore electrical resistance method is used ("Coulter Counter Multisizer 3" and accompanying software "Beckman Coulter Multisizer 3 Version 3.51" (produced by Beckman Coulter, Inc.)). Measurements are carried out using 25,000 effective measurement channels and an aperture diameter of 100 μm, and calculations are carried out by analyzing measured data.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

Moreover, the dedicated software was set up as follows before carrying out measurements and analysis.

On the "Standard Operating Method (SOM) alteration screen" in the dedicated software, the total count number in control mode is set to 50,000 particles, the number of measurements is set to 1, and the Kd value is set to "standard particle 10.0 μm" (Beckman Coulter). By pressing the threshold value/noise level measurement button, threshold values and noise levels are automatically set. In addition, the current is set to 1600 μA, the gain is set to 2, the electrolyte solution is set to ISOTON II (product name), and the "Flush aperture tube after measurement" option is checked.

On the "Screen for converting from pulse to particle diameter" in the dedicated software, the bin interval is set to logarithmic particle diameter, the particle diameter bin is set to 256 particle diameter bin, and the particle diameter range is set to from 2 μm to 60 μm.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker. To this is added approximately 0.3 mL of a diluted liquid obtained by diluting Contaminon N (product name) (a 10 mass % aqueous solution of a neutral detergent for cleaning precision measurement equipment; produced by Wako Pure Chemical Industries, Ltd.) 3-fold in terms of mass with ion exchanged water.

(3) A prescribed amount of ion exchanged water and approximately 2 mL of Contaminon N (product name) are added to a water tank in an ultrasonic wave disperser (product name: Ultrasonic Dispersion System Tetora 150 produced by Nikkaki Bios Co., Ltd.) having an electrical output of 120 W, in which 2 oscillators having an oscillation frequency of 50 kHz are housed so that their phases are staggered by 180°.

(4) The beaker used in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner (particles) are added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 10° C. to 40° C.

(6) The aqueous electrolyte solution mentioned in section (5) above, in which the toner (particles) are dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight average particle diameter (D4). When setting the graph/no. % with the dedicated software, the "average diameter" on the "Analysis/number-based statistical values (arithmetic mean)" screen is number average particle diameter (D1).

EXAMPLES

The present invention will now be explained in greater detail by means of the following working examples and comparative examples, but is in no way limited to these examples. Moreover, "parts" in formulations below are on a mass basis unless explicitly stated otherwise.

Production Example of Crystalline Polyester Resin 1

153.0 parts of 1,6-hexane diol, 300.0 parts of 1,10-decanedicarboxylic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 4 hours at 190° C. Crystalline polyester resin 1 was then obtained by gradually depressurizing the system while increasing the temperature to 220° C., and carrying out a polycondensation reaction at 150 Pa. Crystalline polyester resin 1 had a melting point (Tm) of 71.2° C. and a number average molecular weight (Mn) of 5100. Properties of crystalline polyester resin 1 are shown in Table 1.

Production Example of Crystalline Polyester Resin 2

371.0 parts of 1,18-octadecane diol, 483.0 parts of 1,20-eicosanedicarboxylic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 4 hours at 190° C. Crystalline polyester resin 2 was then obtained by gradually depressurizing the system while increasing the temperature to 220° C., and carrying out a polycondensation reaction at 150 Pa. Crystalline polyester resin 2 had a melting point of 74.0° C. and a number average molecular weight of 5800. Properties of crystalline polyester resin 2 are shown in Table 1.

Production Example of Crystalline Polyester Resin 3

80.0 parts of ethylene glycol, 172.0 parts of glutaric acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 4 hours at 190° C. Crystalline polyester resin 3 was then obtained by gradually depressurizing the system while increasing the temperature to 220° C., and carrying out a polycondensation reaction at 150 Pa. Crystalline polyester resin 3 had a melting point of 86.2° C. and a number average molecular weight of 4200. Properties of crystalline polyester resin 3 are shown in Table 1.

Production Example of Crystalline Polyester Resin 4

335.0 parts of 1,16-hexadecane diol, 446.0 parts of 1,18-octadecanedicarboxylic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 4 hours at 190° C. Crystalline polyester resin 4 was then obtained by gradually depressurizing the system while increasing the temperature to 220° C., and carrying out a polycondensation reaction at 150 Pa. Crystalline polyester resin 4 had a melting point of 77.3° C. and a number average molecular weight of 6100. Properties of crystalline polyester resin 4 are shown in Table 1.

Production Example of Crystalline Polyester Resin 5

80.0 parts of ethylene glycol, 264.0 parts of sebacic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 4 hours at 190° C. Crystalline polyester resin 5 was then obtained by gradually depressurizing the system while increasing the temperature to 220° C., and carrying out a polycondensation reaction at 150 Pa. Crystalline polyester resin 5 had a melting point of 82.1° C. and a number average molecular weight of 3200. Properties of crystalline polyester resin 5 are shown in Table 1.

Production Example of Crystalline Polyester Resin 6

153.0 parts of 1,6-hexane diol, 300.0 parts of 1,10-decanedicarboxylic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 2 hours at 190° C. Crystalline polyester resin A was then obtained by gradually depressurizing the system while increasing the temperature to 220° C., and carrying out a polycondensation reaction at 150 Pa. Crystalline polyester resin A had a melting point (Tm) of 70.5° C. and a number average molecular weight (Mn) of 3000.

Amorphous polyester resin A was obtained by adding 108.0 parts of an adduct of (2 moles of) ethylene oxide to bisphenol A, 368.0 parts of an adduct of (2 moles of) propylene oxide to bisphenol A, 83.0 parts of terephthalic acid, 78.0 parts of isophthalic acid, 27.0 parts of dodecenylsuccinic acid anhydride and 0.3 parts of dibutyl tin oxide to another reaction vessel equipped with a stirrer, a temperature sensor, a condenser tube and a nitrogen inlet tube, and carrying out a reaction for 4 hours at 180° C., and then for a further 2 hours at 220° C. under reduced pressure. This amorphous polyester resin A had a weight average molecular weight (Mw) of 12,000, a number average molecular weight (Mn) of 6100, and a glass transition temperature (Tg) of 57° C.

Crystalline polyester resin 6 was obtained by adding 100.0 parts of amorphous polyester resin A, 100.0 parts of crystalline polyester resin A and 0.1 parts of dibutyl tin oxide to another reaction vessel equipped with a stirrer, a temperature sensor, a condenser tube and a nitrogen inlet tube, carrying out a reaction for 2 hours at 190° C., gradually depressurizing the system while increasing the temperature to 240° C., and carrying out a reaction at 150 Pa. Crystalline polyester resin 6 was a block polymer having a weight average molecular weight (Mw) of 19,300, a number average molecular weight (Mn) of 13,500 and a melting point (Tm) of 64.2° C. Properties of crystalline polyester resin 6 are shown in Table 1.

Production Example of Crystalline Polyester Resin 7

335.0 parts of 1,16-hexadecane diol, 300.0 parts of 1,10-decanedicarboxylic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 2 hours at 190° C. Crystalline polyester resin B was then obtained by gradually depressurizing the system while increasing the temperature to 220° C., and carrying out a polycondensation reaction at 150 Pa. Crystalline polyester resin B had a melting point (Tm) of 81.0° C. and a number average molecular weight (Mn) of 4000.

Amorphous polyester resin B was obtained by adding 108.0 parts of an adduct of (2 moles) of ethylene oxide to bisphenol A, 368.0 parts of an adduct of (2 moles of) propylene oxide to bisphenol A, 83.0 parts of terephthalic acid, 78.0 parts of isophthalic acid, 27.0 parts of dodecenylsuccinic acid anhydride and 0.3 parts of dibutyl tin oxide to another reaction vessel equipped with a stirrer, a temperature sensor, a condenser tube and a nitrogen inlet tube, and carrying out a reaction for 4 hours at 180° C., and then for a further 2 hours at 220° C. under reduced pressure. This amorphous polyester resin B had a weight average molecular weight (Mw) of 12,000, a number average molecular weight (Mn) of 6100, and a glass transition temperature (Tg) of 57° C.

Crystalline polyester resin 7 was obtained by adding 100.0 parts of amorphous polyester resin B, 100.0 parts of crystalline polyester resin B and 0.1 parts of dibutyl tin oxide to another reaction vessel equipped with a stirrer, a temperature sensor, a condenser tube and a nitrogen inlet tube, carrying out a reaction for 2 hours at 190° C., gradually depressurizing the system while increasing the temperature to 240° C., and carrying out a reaction at 150 Pa. Crystalline polyester resin 7 was a block polymer having a weight average molecular weight (Mw) of 21,500, a number average molecular weight (Mn) of 15,100 and a melting point (Tm) of 78.0° C. Properties of crystalline polyester resin 7 are shown in Table 1.

Production Example of Crystalline Polyester Resin 8

153.0 parts of 1,6-hexane diol, 227.0 parts of suberic acid and 0.3 parts of titanium (IV) isopropoxide as an esterification catalyst were added to a reaction vessel equipped with a stirrer, a temperature sensor, a condenser tube and a nitrogen inlet tube, and a reaction was carried out for 2 hours at 190° C. Crystalline polyester resin C was then obtained by gradually depressurizing the system while increasing the temperature to 220° C., and carrying out a polycondensation reaction at 150 Pa. Crystalline polyester resin C had a melting point (Tm) of 73.9° C. and a number average molecular weight (Mn) of 3600.

Amorphous polyester resin C was obtained by adding 108.0 parts of an adduct of (2 moles) of ethylene oxide to bisphenol A, 368.0 parts of an adduct of (2 moles of) propylene oxide to bisphenol A, 83.0 parts of terephthalic acid, 78.0 parts of isophthalic acid, 27.0 parts of dodecenylsuccinic acid anhydride and 0.3 parts of dibutyl tin oxide to another reaction vessel equipped with a stirrer, a temperature sensor, a condenser tube and a nitrogen inlet tube, and carrying out a reaction for 4 hours at 180° C., and then for a further 2 hours at 220° C. under reduced pressure. This amorphous polyester resin C had a weight average molecular weight (Mw) of 12,000, a number average molecular weight (Mn) of 6100, and a glass transition temperature (Tg) of 57° C.

Crystalline polyester resin 8 was obtained by adding 100.0 parts of amorphous polyester resin C, 100.0 parts of crystalline polyester resin C and 0.1 parts of dibutyl tin oxide to another reaction vessel equipped with a stirrer, a temperature sensor, a condenser tube and a nitrogen inlet tube, carrying out a reaction for 2 hours at 190° C., gradually depressurizing the system while increasing the temperature to 240° C., and carrying out a reaction at 150 Pa. Crystalline polyester resin 8 was a block polymer having a weight average molecular weight (Mw) of 22,300, a number average molecular weight (Mn) of 16,200 and a melting point (Tm) of 71.5° C. Properties of crystalline polyester resin 8 are shown in Table 1.

Production Example of Amorphous Resin 1

Amorphous resin 1, which was an amorphous polyester resin, was obtained by adding 108.0 parts of an adduct of (2 moles of) ethylene oxide to bisphenol A, 368.0 parts of an adduct of (2 moles of) propylene oxide to bisphenol A, 83.0 parts of terephthalic acid, 78.0 parts of isophthalic acid, 27.0 parts of dodecenylsuccinic acid anhydride and 0.3 parts of dibutyl tin oxide to a reaction vessel equipped with a stirrer, a temperature sensor, a condenser tube and a nitrogen inlet tube, and carrying out a reaction for 4 hours at 180° C., and then for a further 2 hours at 220° C. under reduced pressure. This amorphous resin 1 had a weight average molecular weight (Mw) of 12,000, a number average molecular weight (Mn) of 6100, and a glass transition temperature (Tg) of 57° C.

Production Example of Dispersed Solution of Crystalline Polyester Resin 1

100 parts of crystalline polyester resin 1 was placed in a Cavitron CD1010 (produced by Eurotec) and dispersed using a disperser that had been modified into a high temperature high pressure type disperser. More specifically, a dispersed solution of crystalline polyester resin 1 having a number average particle diameter of 160 nm was obtained at a compositional ratio of 79% of ion exchanged water, 1% (in terms of active ingredient) of an anionic surfactant (Neogen RK produced by Dai-ichi Kogyo Seiyaku Co., Ltd.) and 20% of solids by adjusting the pH to 8.5 using ammonia, and operating the Cavitron under conditions whereby the rotor rotational speed was 60 Hz, the pressure was 5 kg/$cm^2$ and the system was heated to 140° C. using a heat exchanger.

Production Examples of Dispersed Solutions of Crystalline Polyester Resins 2 to 8

Dispersed solutions of crystalline polyester resins 2 to 8 were obtained in the same way as in the production example of dispersed solution of crystalline polyester resin 1, except that crystalline polyester resin 1 was replaced with crystalline polyester resins 2 to 8.

Production Example of Dispersed Solution of Amorphous Resin 1

100 parts of amorphous resin 1 was placed in a Cavitron CD1010 (produced by Eurotec) and dispersed using a disperser that had been modified into a high temperature high pressure type disperser. More specifically, a dispersed solution of amorphous resin 1 having a number average particle diameter of 150 nm was obtained at a compositional ratio of 79% of ion exchanged water, 1% (in terms of active ingredient) of an anionic surfactant (Neogen RK produced by Dai-ichi Kogyo Seiyaku Co., Ltd.) and 20% of solids by adjusting the pH to 8.5 using ammonia, and operating the Cavitron under conditions whereby the rotor rotational speed was 60 Hz, the pressure was 5 kg/$cm^2$ and the system was heated to 140° C. using a heat exchanger.

| Production Example of Release Agent Fine Particle-Dispersed Solution | |
|---|---|
| Release agent: HNP-51 (produced by Nippon Seiro Co., Ltd.): | 100 parts |
| Anionic surfactant (Neogen RK produced by Dai-ichi Kogyo Seiyaku Co., Ltd.): | 5 parts |
| Ion exchanged water: | 395 parts |

The materials listed above were weighed out and placed in a mixing vessel equipped with a stirring device, heated to 90° C. and dispersed for 60 minutes by being circulated in a Clearmix W-Motion (produced by M Technique Co., Ltd.). The dispersion treatment conditions were as follows.

Rotor outer diameter: 3 cm

Clearance: 0.3 mm

Rotational speed of rotor: 19,000 rpm

Rotational speed of screen: 19,000 rpm

Following the dispersion treatment, an aqueous dispersed solution in which the concentration of release agent fine particles was 20 mass % (a release agent fine particle-dispersed solution) was obtained by cooling to 40° C. under cooling conditions whereby the rotor rotational speed was 1000 rpm, the screen rotational speed was 0 rpm and the cooling rate was 10° C./min.

The 50% particle diameter on a volume basis (D50) of the release agent (aliphatic hydrocarbon compound) fine particles was measured using a dynamic light scattering particle size distribution analyzer (a Nanotrac UPA-EX150 produced by Nikkiso Co., Ltd.), and found to be 0.15 μm.

| Production of Colorant Fine Particle-Dispersed Solution | |
|---|---|
| Colorant: (Cyan pigment, Pigment Blue 15:3 produced by Dainichiseika Color and Chemicals Mfg. Co., Ltd.) | 50.0 parts |
| Anionic surfactant (Neogen RK produced by Dai-ichi Kogyo Seiyaku Co., Ltd.): | 7.5 parts |
| Ion exchanged water: | 442.5 parts |

An aqueous dispersed solution containing colorant fine particles at a concentration of 10 mass % (a colorant fine particle-dispersed solution) was obtained by weighing out, mixing and dissolving the materials listed above and dispersing for approximately 1 hour using a Nanomizer high pressure impact disperser (produced by Yoshida Kikai Co., Ltd.) so as to disperse the colorant.

The 50% particle diameter on a volume basis (D50) of the colorant fine particle was measured using a dynamic light scattering particle size distribution analyzer (a Nanotrac UPA-EX150 produced by Nikkiso Co., Ltd.), and found to be 0.20 μm.

Preparation of Silica Fine Particles 1

10.0 parts of polydimethylsiloxane (viscosity 100 $mm^2$/s) was sprayed onto 100 parts of fumed silica (product name: Aerosil 380S, BET specific surface area: 380 $m^2$/g, number average primary particle diameter: 7 nm, produced by Nippon Aerosil Co., Ltd.), and stirring was continued for 30 minutes. Silica fine particles 1 were then prepared by increasing the temperature to 300° C. while stirring and stirring for a further 2 hours.

Production Example of Toner 1

| Production of Toner by Emulsion Aggregation | |
|---|---|
| Dispersed solution (20%) of crystalline polyester resin 1: | 185.0 parts |
| Dispersed solution (20%) of amorphous resin 1: | 315.0 parts |
| Release agent fine particle-dispersed solution (20%): | 40.0 parts |
| Colorant fine particle-dispersed solution (10%): | 80.0 parts |
| Ion exchanged water: | 160.0 parts |
| 10.0 mass % aqueous solution of borax: | 2.0 parts |

(Borax: sodium tetraborate decahydrate ($Na_2B_4O_7.10H_2O$) produced by Wako Pure Chemical Industries, Ltd.)

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. The volume average particle diameter of the formed aggregated particles was appropriately checked using a Coulter Multisizer III, and when aggregated particles having a size of 6.2 μm were formed, the pH was adjusted to 9.0 using a 5% aqueous solution of sodium hydroxide. The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours. The mixture was then cooled to 25° C., filtered, subjected to solid-liquid separation, and then washed with ion exchanged water. Following completion of the washing, toner particles 1 having a weight average particle diameter (D4) of 6.3 μm were obtained by drying with a vacuum dryer.

Toner particle 1 was subjected to external addition. Toner 1 was obtained by dry mixing 100.0 parts of toner particle 1 and 1.5 parts of silica fine particle 1 for 5 minutes using a Henschel mixer (produced by Mitsui Mining Co., Ltd.). Physical properties of obtained toner 1 are shown in Table 4-1.

Production Examples of Toners 2 to 18 and 34 to 37

Toners 2 to 18 and 34 to 37 were obtained by carrying out the same procedure as that used in the production example of toner 1, except that the types and added amounts of the dispersed solution of crystalline polyester resin 1 and the dispersed solution of amorphous polyester resin 1, and the concentration and added amount of the aqueous solution of borax were changed as shown in Table 2. Physical properties of the toners are shown in Tables 4-1 and 4-2.

Production Example of Toner 19

| Production of Toner by Emulsion Aggregation | |
|---|---|
| Dispersed solution (20%) of crystalline polyester resin 1: | 185.0 parts |
| Dispersed solution (20%) of amorphous resin 1: | 265.0 parts |
| Release agent fine particle-dispersed solution (20%): | 40.0 parts |
| Colorant fine particle-dispersed solution (10%): | 80.0 parts |
| Ion exchanged water: | 160.0 parts |
| 10.0 mass % aqueous solution of borax: | 20.0 parts |

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. The volume average particle diameter of the formed aggregated particles was appropriately checked using a Coulter Multisizer III, and when aggregated particles having a size of 6.0 μm were formed, 50.0 parts of the dispersed solution of amorphous resin 1 was added, the volume average particle diameter of the aggregated particles was checked again, and when aggregated particles having a size of 6.1 μm were formed, the pH was adjusted to 9.0 using a 5% aqueous solution of sodium hydroxide. The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours. The mixture was then cooled to 25° C., filtered, subjected to solid-liquid separation, and then washed with ion exchanged water. Following completion of the washing, toner particles 19 having a weight average particle diameter (D4) of 6.3 μm were obtained by drying with a vacuum dryer.

Toner 19 was obtained by subjecting toner particle 19 to the same external addition as that carried out for toner 1. Physical properties of toners 19 are shown in Table 4-1.

Production Examples of Toners 20 to 30

Toners 20 to 30 were obtained by carrying out the same procedure as that used in the production example of toner 19, except that the types and added amounts of the dispersed solution of crystalline polyester resin 1 and the dispersed solution of amorphous polyester resin 1, and the concentration and added amount of the aqueous solution of borax were changed as shown in Table 3. Physical properties of the toners are shown in Tables 4-1 and 4-2.

Production Example of Toner 31

| Production of Toner by Emulsion Aggregation | |
|---|---|
| Dispersed solution (20%) of crystalline polyester resin 1: | 185.0 parts |
| Dispersed solution (20%) of amorphous resin 1: | 265.0 parts |
| Release agent fine particle-dispersed solution (20%): | 40.0 parts |
| Colorant fine particle-dispersed solution (10%): | 80.0 parts |
| Ion exchanged water: | 160.0 parts |

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. The volume average particle diameter of the formed aggregated particles was appropriately checked using a Coulter Multisizer III, and when aggregated particles having a size of 6.0 μm were formed, 20.0 parts of a 10.0 mass % aqueous solution of borax was added. Following the addition of the aqueous solution of borax, 50.0 parts of the dispersed solution of amorphous resin 1 was added, the volume average particle diameter of the aggregated particles was checked again, and when aggregated particles having a size of 6.1 μm had been formed, the pH was adjusted to 9.0 using a 5% aqueous solution of sodium hydroxide. The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours. The mixture was then cooled to 25° C., filtered, subjected to solid-liquid separation, and then washed with ion exchanged water. Following completion of the washing, toner particles 31 having a weight average particle diameter (D4) of 6.3 μm were obtained by drying with a vacuum dryer. Toner 31 was obtained by subjecting toner particle 31 to the same external addition as that carried out for toner 1. Physical properties of toner 31 are shown in Table 4-2.

Production Example of Toner 32

Toner 32 was obtained in the same way as in the production example of toner 19, except that the 20.0 parts of the 10.0 mass % aqueous solution of borax was replaced with 13.0 parts of a 10.0 mass % aqueous solution of boric acid (boric acid; $H_3BO_3$ produced by FUJIFILM Wako Pure Chemical Corporation). Physical properties of toner 32 are shown in Table 4-2.

Production Example of Toner 33

| Production of Toner by Pulverization Method | |
|---|---|
| Crystalline polyester resin 1: | 37.0 parts |
| Amorphous resin 1: | 63.0 parts |
| C. I. Pigment Blue 15:3: | 8.0 parts |
| Release agent (HNP-51 produced by Nippon Seiro Co., Ltd.; melting point 74° C.): | 8.0 parts |
| Negative charge control agent (T-77 produced by Hodogaya Chemical Co., Ltd.): | 2.0 parts |
| Boric acid powder (produced by FUJIFILM Wako Pure Chemical Corporation): | 1.3 parts |

The materials listed above were pre-mixed using an FM mixer (produced by Nippon Coke & Engineering Co., Ltd.), and then melt kneaded using a twin screw kneading extruder (a PCM-30 produced by Ikegai Corporation).

Toner particle 33, which had a weight average particle diameter (D4) of 7.0 μm, was obtained by cooling the obtained kneaded product, coarsely pulverizing using a hammer mill, pulverizing using a mechanical pulverizer (T-250 produced by Turbo Kogyo), and classifying the obtained finely pulverized powder using a multiple section sorting apparatus using the Coanda effect.

Toner 33 was obtained by subjecting toner particle 33 to the same external addition as that carried out for toner 1. Physical properties of toner 33 are shown in Table 4-2.

Example 1

Toner 1 was subjected to the following evaluations.

<1> Evaluation of Low-Temperature Fixability

A process cartridge charged with a toner was allowed to stand for 48 hours in a normal temperature normal humidity (N/N) environment (a temperature of 23° C. and a relative humidity of 60%). Using an LBP652C printer modified so as to be operable even with the fixing unit removed, a square image measuring 10 mm×10 mm was outputted as an unfixed image of an image pattern, in which 9 points were uniformly arranged, onto the entire surface of a transfer paper. The amount of toner applied to the transfer paper was 0.80 mg/cm$^2$, and the fixing onset temperature was evaluated. Moreover, the transfer paper was Fox River Bond (90 g/m$^2$).

The fixing unit of the LBP652C was removed, and an external fixing unit configured so as to be operable outside a laser printer was used. Moreover, the external fixing unit was such that the fixation temperature was increased from 110° C. at intervals of 10° C. and fixing was performed at a process speed of 220 mm/sec.

A fixed image was rubbed using a silbon paper (Lenz Cleaning Paper "dasper(R)" (Ozu Paper Co., Ltd.)) while applying a load of 50 g/cm$^2$. In addition, low-temperature fixability was evaluated using the criteria shown below, with the fixing onset temperature taken to be a temperature at which the density decrease rate following rubbing reached 10% or less. The evaluation results are shown in Table 5.

Evaluation Criteria

A: Fixing onset temperature is 110° C.
B: Fixing onset temperature is 120° C.
C: Fixing onset temperature is 130° C.
D: Fixing onset temperature is at least 140° C.

<2> Evaluation of Charging Performance

The difference in charge quantity between a low temperature low humidity (LL) environment and a high temperature high humidity (HH) environment was evaluated using the following method. 0.7 g of toner and 9.3 g of a prescribed carrier (an Imaging Society of Japan standard carrier: a spherical carrier N-01 obtained by surface treating a ferrite core) are placed in a lidded plastic bottle and left to stand for 5 days in an LL environment at a temperature of 15° C. and a relative humidity of 10% and a HH environment at a temperature of 35.0° C. and a relative humidity of 85%.

The lid is closed on the plastic bottle containing the carrier and the toner, the bottle is shaken for 1 minute at a speed of 4 reciprocations per second using a shaker (YS-LD produced by Yayoi Co., Ltd.), and a developer containing the toner and the carrier is charged. Next, triboelectric charge quantity is measured using an apparatus for measuring triboelectric charge quantity shown in FIG. 1. From 0.5 g to 1.5 g of the developer is placed in a metal measurement container 2 having a screen 3 having an opening size of 20 μm, as shown in FIG. 1, and a metal lid 4 is attached. At this point, the mass of the overall measurement container 2 is measured precisely and represented by W1 (g). Next, suction is carried out from a suction port 7 in a suction device 1 (a part adjacent to the measurement container 2 is at least an insulator), and an air quantity control valve 6 is adjusted so that the pressure shown on a vacuum gauge 5 is 2.5 kPa. The toner is removed through suction by carrying out suction in this state for 2 minutes. At this point, the voltage of a potentiometer 9 is represented by V (V). Here, 8 is a capacitor which has a capacity of C (mF). In addition, the mass of the overall measurement container following the suction is measured precisely and represented by W2 (g). The triboelectric charge quantity Q (mC/kg) of this sample is calculated using the following formula.

$$\text{Triboelectric charge quantity } Q \text{ (mC/kg) of sample} = C \times V/(W1 - W2)$$

If the triboelectric charge quantity of the sample immediately after shaking in the LL environment is represented by QL (mC/kg) and the triboelectric charge quantity in the HH environment is represented by QH (mC/kg), the value of QH/QL serves as an indicator of environmental stability. The evaluation results are shown in Table 5.

Evaluation Criteria

A: The value of QH/QL is not less than 0.85
B: The value of QH/QL is not less than 0.80 and less than 0.85
C: The value of QH/QL is not less than 0.75 and less than 0.80
D: The value of QH/QL is less than 0.75

<3> Evaluation of Hot Offset Resistance

In the test carried out in section <1> above, an unfixed toner image (0.6 mg/$cm^2$) having a height of 2.0 cm and a width of 15.0 cm was formed as an unfixed image on a part 1.0 cm from the upper edge of a paper in the paper passing direction. The external fixing unit was such that the fixation temperature was increased from 110° C. at intervals of 10° C. and fixing was performed at a process speed of 200 mm/sec. The temperature at which hot offset occurred was taken to be the hot offset temperature, and the fixing range was calculated using the fixing onset temperature obtained in section <1> above and the formula below.

Fixing range (° C.)=(hot offset temperature minus fixing onset temperature)

The evaluation results are shown in Table 5.

Evaluation Criteria

A: The fixing range is 60° C. or more
B: The fixing range is not less than 50° C. but less than 60° C.
C: The fixing range is not less than 30° C. but less than 50° C.
D: The fixing range is less than 30° C.

<4> Evaluation of Penetration Into Paper

Using an image fixed at a temperature that was 30° C. higher than the fixing onset temperature in the test carried out in section <1> above, gloss was measured at all the points in the images at a light incidence angle of 75° using a handy gloss meter (Gloss Meter PG-3D produced by Nippon Denshoku Industries Co., Ltd.), and the difference between the maximum and minimum values was taken to be the gloss non-uniformity, and this was taken to be an indicator of penetration into paper. The evaluation results are shown in Table 5.

Evaluation Criteria

A: The gloss non-uniformity is less than 4
B: The gloss non-uniformity is not less than 4 and less than 7
C: The gloss non-uniformity is not less than 7 and less than 10
D: The gloss non-uniformity is not less than 10

<5> Durability

Durability was evaluated using a commercially available Canon LBP9200C printer. The LBP9200C uses mono-component contact development, and regulates the amount of toner on a developer carrier by means of a toner control member. A cartridge obtained by removing toner contained in a commercially available cartridge, cleaning the inner part of the cartridge with an air blower and then filling with 150 g of the toner to be evaluated was used as an evaluation cartridge. Evaluation was carried out by fitting the cartridge mentioned above to the cyan station and fitting dummy cartridges to the other stations.

The evaluation was carried out in a normal temperature normal humidity environment (a temperature of 23° C. and a relative humidity of 60%). Using A4 size CS-680 (basis weight 68 g/$cm^2$) as a transfer material, 12,000 1% images were continuously outputted, after which the developer container was taken apart, and the surfaces and edges of the toner carrying member were visually inspected. The evaluation results are shown in Table 5.

Evaluation Criteria

A: There were absolutely no circumferential streaks caused by trapping of foreign bodies between a toner control member and a toner carrying member caused by toner rupture or melting at the surfaces or edges of the toner carrying member.
B: Slight trapping of foreign bodies was observed between a toner carrying member and a toner edge seal
C: 1 to 4 circumferential streaks were seen at edges
D: 5 or more circumferential streaks were seen throughout Examples 2 to 33

Toners 2 to 33 were subjected to the same evaluations as Example 1. The results are shown in Table 5.

Comparative Examples 1 to 4

Toners 34 to 37 were subjected to the same evaluations as Example 1. The results are shown in Table 5.

TABLE 1

| Crystalline polyester resin No. | Block polymer | Alcohol monomer | Acid monomer | Melting point (° C.) | Ester group concentration (mmol/g) | Mw | Mn |
|---|---|---|---|---|---|---|---|
| 1 | — | 1,6-hexane diol | 1,10-decanedicarboxylic acid | 71.2 | 6.40 | 13500 | 5100 |
| 2 | — | 1,18-octadecane diol | 1,20-eicosanedicarboxylic acid | 74.0 | 3.22 | 12500 | 5800 |

TABLE 1-continued

| Crystalline polyester resin No. | Block polymer | Alcohol monomer | Acid monomer | Melting point (° C.) | Ester group concentration (mmol/g) | Mw | Mn |
|---|---|---|---|---|---|---|---|
| 3 | — | Ethylene glycol | Glutaric acid | 86.2 | 12.64 | 13000 | 4200 |
| 4 | — | 1,16-hexadecane diol | 1,18-octadecanedicarboxylic acid | 77.3 | 3.54 | 14300 | 6100 |
| 5 | — | Ethylene glycol | Sebacic acid | 82.1 | 8.76 | 12200 | 3200 |
| 6 | Block polymer | 1,6-hexane diol | 1,10-decanedicarboxylic acid | 64.2 | 6.40 | 19300 | 13500 |
| 7 | Block polymer | 1,16-hexadecane diol | 1,10-decanedicarboxylic acid | 78.0 | 4.42 | 21500 | 15100 |
| 8 | Block polymer | 1,6-hexane diol | Suberic acid | 71.5 | 7.80 | 22300 | 16200 |

TABLE 2

| Toner | Type of crystalline polyester | Parts | Amorphous resin | Parts | Boric acid component | Parts |
|---|---|---|---|---|---|---|
| Toner 1 | Dispersed solution of crystalline polyester resin 1 | 185.0 | Dispersed solution of amorphous resin 1 | 315.0 | 10% aqueous solution of borax | 2.0 |
| Toner 2 | Dispersed solution of crystalline polyester resin 1 | 185.0 | Dispersed solution of amorphous resin 1 | 315.0 | 10% aqueous solution of borax | 10.0 |
| Toner 3 | Dispersed solution of crystalline polyester resin 1 | 185.0 | Dispersed solution of amorphous resin 1 | 315.0 | 10% aqueous solution of borax | 20.0 |
| Toner 4 | Dispersed solution of crystalline polyester resin 1 | 250.0 | Dispersed solution of amorphous resin 1 | 250.0 | 10% aqueous solution of borax | 40.0 |
| Toner 5 | Dispersed solution of crystalline polyester resin 1 | 325.0 | Dispersed solution of amorphous resin 1 | 175.0 | 10% aqueous solution of borax | 100.0 |
| Toner 6 | Dispersed solution of crystalline polyester resin 1 | 375.0 | Dispersed solution of amorphous resin 1 | 125.0 | 10% aqueous solution of borax | 100.0 |
| Toner? | Dispersed solution of crystalline polyester resin 1 | 425.0 | Dispersed solution of amorphous resin 1 | 75.0 | 10% aqueous solution of borax | 100.0 |
| Toner 8 | Dispersed solution of crystalline polyester resin 1 | 475.0 | Dispersed solution of amorphous resin 1 | 25.0 | 10% aqueous solution of borax | 100.0 |
| Toner 9 | Dispersed solution of crystalline polyester resin 1 | 325.0 | Dispersed solution of amorphous resin 1 | 175.0 | 20% aqueous solution of borax | 75.0 |
| Toner 10 | Dispersed solution of crystalline polyester resin 1 | 325.0 | Dispersed solution of amorphous resin 1 | 175.0 | 20% aqueous solution of borax | 90.0 |
| Toner 11 | Dispersed solution of crystalline polyester resin 1 | 325.0 | Dispersed solution of amorphous resin 1 | 175.0 | 20% aqueous solution of borax | 100.0 |
| Toner 12 | Dispersed solution of crystalline polyester resin 2 | 185.0 | Dispersed solution of amorphous resin 1 | 315.0 | 10% aqueous solution of borax | 20.0 |
| Toner 13 | Dispersed solution of crystalline polyester resin 3 | 185.0 | Dispersed solution of amorphous resin 1 | 315.0 | 10% aqueous solution of borax | 20.0 |
| Toner 14 | Dispersed solution of crystalline polyester resin 4 | 185.0 | Dispersed solution of amorphous resin 1 | 315.0 | 10% aqueous solution of borax | 20.0 |
| Toner 15 | Dispersed solution of crystalline polyester resin 5 | 185.0 | Dispersed solution of amorphous resin 1 | 315.0 | 10% aqueous solution of borax | 20.0 |
| Toner 16 | Dispersed solution of crystalline polyester resin 6 | 375.0 | Dispersed solution of amorphous resin 1 | 125.0 | 10% aqueous solution of borax | 100.0 |
| Toner 17 | Dispersed solution of crystalline polyester resin 7 | 375.0 | Dispersed solution of amorphous resin 1 | 125.0 | 10% aqueous solution of borax | 100.0 |
| Toner 18 | Dispersed solution of crystalline polyester resin 8 | 375.0 | Dispersed solution of amorphous resin 1 | 125.0 | 10% aqueous solution of borax | 100.0 |
| Toner 33 | Crystalline polyester resin 1 | 37.0 | Amorphous resin 1 | 63.0 | Boric acid powder | 1.3 |
| Toner 34 | Dispersed solution of crystalline polyester resin 1 | 185.0 | Dispersed solution of amorphous resin 1 | 315.0 | 10% aqueous solution of borax | 0.2 |
| Toner 35 | Dispersed solution of crystalline polyester resin 1 | 225.0 | Dispersed solution of amorphous resin 1 | 275.0 | 20% aqueous solution of borax | 125.0 |
| Toner 36 | Dispersed solution of crystalline polyester resin 1 | 100.0 | Dispersed solution of amorphous resin 1 | 400.0 | 10% aqueous solution of borax | 10.0 |
| Toner 37 | Dispersed solution of crystalline polyester resin 1 | 500.0 | Dispersed solution of amorphous resin 1 | 0.0 | 10% aqueous solution of borax | 50.0 |

TABLE 3

| | Core | | | | | | Shell | | Core/shell interface | |
|---|---|---|---|---|---|---|---|---|---|---|
| Toner | Type of crystalline polyester | Parts | Amorphous resin | Parts | Boric acid component | Parts | Amorphous resin | Parts | Boric acid component | Parts |
| Toner 19 | Dispersed solution of crystalline polyester resin 1 | 185.0 | Dispersed solution of amorphous resin 1 | 265.0 | 10% aqueous solution of borax | 20.0 | Dispersed solution of amorphous resin 1 | 50.0 | — | — |
| Toner 20 | Dispersed solution of crystalline polyester resin 1 | 250.0 | Dispersed solution of amorphous resin 1 | 200.0 | 10% aqueous solution of borax | 40.0 | Dispersed solution of amorphous resin 1 | 50.0 | — | — |
| Toner 21 | Dispersed solution of crystalline polyester resin 1 | 375.0 | Dispersed solution of amorphous resin 1 | 75.0 | 10% aqueous solution of borax | 100.0 | Dispersed solution of amorphous resin 1 | 50.0 | — | — |
| Toner 22 | Dispersed solution of crystalline polyester resin 1 | 425.0 | Dispersed solution of amorphous resin 1 | 25.0 | 10% aqueous solution of borax | 100.0 | Dispersed solution of amorphous resin 1 | 50.0 | — | — |
| Toner 23 | Dispersed solution of crystalline polyester resin 1 | 450.0 | Dispersed solution of amorphous resin 1 | 0.0 | 10% aqueous solution of borax | 100.0 | Dispersed solution of amorphous resin 1 | 50.0 | — | — |
| Toner 24 | Dispersed solution of crystalline polyester resin 1 | 325.0 | Dispersed solution of amorphous resin 1 | 125.0 | 20% aqueous solution of borax | 75.0 | Dispersed solution of amorphous resin 1 | 50.0 | — | — |
| Toner 25 | Dispersed solution of crystalline polyester resin 1 | 325.0 | Dispersed solution of amorphous resin 1 | 125.0 | 20% aqueous solution of borax | 90.0 | Dispersed solution of amorphous resin 1 | 50.0 | — | — |
| Toner 26 | Dispersed solution of crystalline polyester resin 4 | 185.0 | Dispersed solution of amorphous resin 1 | 265.0 | 10% aqueous solution of borax | 20.0 | Dispersed solution of amorphous resin 1 | 50.0 | — | — |
| Toner 27 | Dispersed solution of crystalline polyester resin 5 | 185.0 | Dispersed solution of amorphous resin 1 | 265.0 | 10% aqueous solution of borax | 20.0 | Dispersed solution of amorphous resin 1 | 50.0 | — | — |
| Toner 28 | Dispersed solution of crystalline polyester resin 6 | 375.0 | Dispersed solution of amorphous resin 1 | 75.0 | 10% aqueous solution of borax | 100.0 | Dispersed solution of amorphous resin 1 | 50.0 | — | — |
| Toner 29 | Dispersed solution of crystalline polyester resin 7 | 375.0 | Dispersed solution of amorphous resin 1 | 75.0 | 10% aqueous solution of borax | 100.0 | Dispersed solution of amorphous resin 1 | 50.0 | — | — |
| Toner 30 | Dispersed solution of crystalline polyester resin 8 | 375.0 | Dispersed solution of amorphous resin 1 | 75.0 | 10% aqueous solution of borax | 100.0 | Dispersed solution of amorphous resin 1 | 50.0 | — | — |
| Toner 31 | Dispersed solution of crystalline polyester resin 1 | 185.0 | Dispersed solution of amorphous resin 1 | 265.0 | — | — | Dispersed solution of amorphous resin 1 | 50.0 | 10% aqueous solution of borax | 20.0 |
| Toner 32 | Dispersed solution of crystalline polyester resin 1 | 185.0 | Dispersed solution of amorphous resin 1 | 265.0 | 10% aqueous solution of boric acid | 13.0 | Dispersed solution of amorphous resin 1 | 50.0 | — | — |

In tables 4-1 and 4-2, "Crystalline polyester ratio" is the content (Y; mass %) of the crystalline polyester resin in the toner, and the "Boric acid ratio" is the content (X; mass %) of boric acid in the toner. "Boric acid/crystalline polyester" ratio is the value of X relative to Y (X/Y). "Structure" indicates the mass ratio of the resins of the core and the shell.

TABLE 4-1

| Toner No. | Crystalline polyester | Crystalline polyester ratio (%) | Boric acid component | Boric acid ratio (%) | Boric acid/ crystalline polyester ratio | Weight average particle diameter (D4) µm | Structure: Structure | Structure: Location of boric acid component | Production method |
|---|---|---|---|---|---|---|---|---|---|
| 1 | Crystalline polyester 1 | 31.37 | 10% aqueous solution of borax | 0.11 | 0.004 | 6.3 | — | — | Emulsion aggregation |
| 2 | Crystalline polyester 1 | 31.16 | 10% aqueous solution of borax | 0.55 | 0.018 | 6.3 | — | — | Emulsion aggregation |
| 3 | Crystalline polyester 1 | 30.89 | 10% aqueous solution of borax | 1.08 | 0.035 | 6.2 | — | — | Emulsion aggregation |
| 4 | Crystalline polyester 1 | 41.05 | 10% aqueous solution of borax | 2.13 | 0.052 | 6.1 | — | — | Emulsion aggregation |
| 5 | Crystalline polyester 1 | 50.82 | 10% aqueous solution of borax | 5.07 | 0.100 | 6.4 | — | — | Emulsion aggregation |
| 6 | Crystalline polyester 1 | 58.64 | 10% aqueous solution of borax | 5.07 | 0.086 | 6.3 | — | — | Emulsion aggregation |
| 7 | Crystalline polyester 1 | 66.46 | 10% aqueous solution of borax | 5.07 | 0.076 | 6.4 | — | — | Emulsion aggregation |

TABLE 4-1-continued

| Toner No. | Crystalline polyester | Crystalline polyester ratio (%) | Boric acid component | Boric acid ratio (%) | Boric acid/crystalline polyester ratio | Weight average particle diameter (D4) µm | Structure: Structure | Structure: Location of boric acid component | Production method |
|---|---|---|---|---|---|---|---|---|---|
| 8 | Crystalline polyester 1 | 74.28 | 10% aqueous solution of borax | 5.07 | 0.068 | 6.4 | — | — | Emulsion aggregation |
| 9 | Crystalline polyester 1 | 48.89 | 20% aqueous solution of borax | 7.32 | 0.150 | 6.1 | — | — | Emulsion aggregation |
| 10 | Crystalline polyester 1 | 47.79 | 20% aqueous solution of borax | 8.58 | 0.180 | 6.5 | — | — | Emulsion aggregation |
| 11 | Crystalline polyester 1 | 47.09 | 20% aqueous solution of borax | 9.40 | 0.200 | 6.2 | — | — | Emulsion aggregation |
| 12 | Crystalline polyester 2 | 30.89 | 10% aqueous solution of borax | 1.08 | 0.035 | 6.3 | — | — | Emulsion aggregation |
| 13 | Crystalline polyester 3 | 30.89 | 10% aqueous solution of borax | 1.08 | 0.035 | 6.7 | — | — | Emulsion aggregation |
| 14 | Crystalline polyester 4 | 30.89 | 10% aqueous solution of borax | 1.08 | 0.035 | 6.3 | — | — | Emulsion aggregation |
| 15 | Crystalline polyester 5 | 30.89 | 10% aqueous solution of borax | 1.08 | 0.035 | 6.1 | — | — | Emulsion aggregation |
| 16 | Crystalline polyester 6 | 58.64 | 10% aqueous solution of borax | 5.07 | 0.086 | 6.4 | — | — | Emulsion aggregation |
| 17 | Crystalline polyester 7 | 58.64 | 10% aqueous solution of borax | 5.07 | 0.086 | 6.5 | — | — | Emulsion aggregation |
| 18 | Crystalline polyester 8 | 58.64 | 10% aqueous solution of borax | 5.07 | 0.086 | 6.5 | — | — | Emulsion aggregation |
| 19 | Crystalline polyester 1 | 30.89 | 10% aqueous solution of borax | 1.08 | 0.035 | 6.2 | Core 90/ shell 10 | Core | Emulsion aggregation |
| 20 | Crystalline polyester 1 | 41.05 | 10% aqueous solution of borax | 2.13 | 0.052 | 6.3 | Core 90/ shell 10 | Core | Emulsion aggregation |

TABLE 4-2

| Toner No. | Crystalline polyester | Crystalline polyester ratio (%) | Boric acid component | Boric acid ratio (%) | Boric acid/crystalline polyester ratio | Weight average particle diameter (D4) µm | Structure: Structure | Structure: Location of boric acid component | Production method |
|---|---|---|---|---|---|---|---|---|---|
| 21 | Crystalline polyester 1 | 58.64 | 10% aqueous solution of borax | 5.07 | 0.086 | 6.5 | Core 90/ shell 10 | Core | Emulsion aggregation |
| 22 | Crystalline polyester 1 | 66.46 | 10% aqueous solution of borax | 5.07 | 0.076 | 6.4 | Core 90/ shell 10 | Core | Emulsion aggregation |
| 23 | Crystalline polyester 1 | 70.37 | 10% aqueous solution of borax | 5.07 | 0.072 | 6.4 | Core 90/ shell 10 | Core | Emulsion aggregation |
| 24 | Crystalline polyester 1 | 48.89 | 20% aqueous solution of borax | 7.32 | 0.150 | 6.3 | Core 90/ shell 10 | Core | Emulsion aggregation |
| 25 | Crystalline polyester 1 | 47.79 | 20% aqueous solution of borax | 8.58 | 0.180 | 6.2 | Core 90/ shell 10 | Core | Emulsion aggregation |
| 26 | Crystalline polyester 4 | 30.89 | 10% aqueous solution of borax | 1.08 | 0.035 | 6.6 | Core 90/ shell 10 | Core | Emulsion aggregation |
| 27 | Crystalline polyester 5 | 30.89 | 10% aqueous solution of borax | 1.08 | 0.035 | 6.4 | Core 90/ shell 10 | Core | Emulsion aggregation |
| 28 | Crystalline polyester 6 | 58.64 | 10% aqueous solution of borax | 5.07 | 0.086 | 6.5 | Core 90/ shell 10 | Core | Emulsion aggregation |
| 29 | Crystalline polyester 7 | 58.64 | 10% aqueous solution of borax | 5.07 | 0.086 | 6.2 | Core 90/ shell 10 | Core | Emulsion aggregation |
| 30 | Crystalline polyester 8 | 58.64 | 10% aqueous solution of borax | 5.07 | 0.086 | 6.7 | Core 90/ shell 10 | Core | Emulsion aggregation |
| 31 | Crystalline polyester 1 | 30.89 | 10% aqueous solution of borax | 1.08 | 0.035 | 6.3 | Core 90/ shell 10 | Core/shell interface | Emulsion aggregation |
| 32 | Crystalline polyester 1 | 31.10 | 10% aqueous solution of borax | 1.08 | 0.035 | 6.5 | Core 90/ shell 10 | Core | Emulsion aggregation |
| 33 | Crystalline polyester 1 | 30.38 | Boric acid powder | 1.06 | 0.035 | 7.0 | — | — | Pulverization |
| 34 | Crystalline polyester 1 | 31.42 | 10% aqueous solution of borax | 0.01 | 0.000 | 6.4 | — | — | Emulsion aggregation |
| 35 | Crystalline polyester 1 | 31.44 | 20% aqueous solution of borax | 11.33 | 0.360 | 6.5 | — | — | Emulsion aggregation |

TABLE 4-2-continued

| Toner No. | Crystalline polyester | Crystalline polyester ratio (%) | Boric acid component | Boric acid ratio (%) | Boric acid/ crystalline polyester ratio | Weight average particle diameter (D4) μm | Structure: Structure | Structure: Location of boric acid component | Production method |
|---|---|---|---|---|---|---|---|---|---|
| 36 | Crystalline polyester 1 | 16.84 | 10% aqueous solution of borax | 0.55 | 0.032 | 6.2 | — | — | Emulsion aggregation |
| 37 | Crystalline polyester 1 | 81.42 | 10% aqueous solution of borax | 2.64 | 0.032 | 6.3 | — | — | Emulsion aggregation |

TABLE 5

| | | Low-temperature fixability | Hot offset resistance | Charging performance | Penetration into paper | Durability |
|---|---|---|---|---|---|---|
| Example 1 | Toner 1 | C | C | B | C | C |
| Example 2 | Toner 2 | C | C | B | C | C |
| Example 3 | Toner 3 | C | B | B | C | C |
| Example 4 | Toner 4 | A | A | B | A | C |
| Example 5 | Toner 5 | A | A | B | A | C |
| Example 6 | Toner 6 | A | A | B | A | C |
| Example 1 | Toner 7 | A | A | B | B | C |
| Example 8 | Toner 8 | A | B | C | B | C |
| Example 9 | Toner 9 | B | A | B | A | C |
| Example 10 | Toner 10 | C | A | B | A | C |
| Example 11 | Toner 11 | C | B | B | B | C |
| Example 12 | Toner 12 | C | C | B | C | C |
| Example 13 | Toner 13 | C | B | B | C | C |
| Example 14 | Toner 14 | C | B | B | C | C |
| Example 15 | Toner 15 | C | B | B | C | C |
| Example 16 | Toner 16 | A | A | A | A | B |
| Example 17 | Toner 17 | A | A | A | A | B |
| Example 18 | Toner 18 | A | A | A | A | B |
| Example 19 | Toner 19 | C | B | B | C | B |
| Example 20 | Toner 20 | A | A | B | A | B |
| Example 21 | Toner 21 | A | A | B | A | B |
| Example 22 | Toner 22 | A | A | B | B | B |
| Example 23 | Toner 23 | A | B | C | B | B |
| Example 24 | Toner 24 | B | A | B | A | B |
| Example 25 | Toner 25 | C | A | B | A | B |
| Example 26 | Toner 26 | C | B | B | C | B |
| Example 27 | Toner 27 | C | B | B | C | B |
| Example 28 | Toner 28 | A | A | A | A | A |
| Example 29 | Toner 29 | A | A | A | A | A |
| Example 30 | Toner 30 | A | A | A | A | A |
| Example 31 | Toner 31 | C | C | B | C | C |
| Example 32 | Toner 32 | C | B | B | C | B |
| Example 33 | Toner 33 | C | C | C | C | C |
| Comparative Example 1 | Toner 34 | C | D | B | D | D |
| Comparative Example 2 | Toner 35 | D | B | B | D | C |
| Comparative Example 3 | Toner 36 | D | C | B | D | C |
| Comparative Example 4 | Toner 37 | A | D | D | D | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123717, filed Jul. 28, 2021, which is hereby incorporated by reference herein in its entirety.

What is claimed is:

1. A toner, comprising:

a toner particle comprising a binder resin and boric acid;

the binder resin comprising an amorphous resin and a crystalline polyester resin;

a content of the crystalline polyester resin in the toner being 40.00 to 60.00 mass %; and a content of the boric acid in the toner being 0.10 to 10.00 mass %, wherein a ratio of X to Y (X/Y) is 0.040 to 0.130 when X (mass %) is the content of boric acid in the toner and Y (mass %) is the content of crystalline polyester resin in the toner.

2. The toner according to claim 1, wherein the crystalline polyester resin has a crystalline polyester segment, and an ester group concentration in the crystalline polyester segment is 3.50 to 10.00 (ester groups/g) where [Ester group concentration]=([number of ester groups in crystalline polyester segment per 1 mol (ester groups/mol)]×1000)/[molecular weight of crystalline polyester segment (g/mol)].

3. The toner according to claim 1, wherein the content of the boric acid in the toner is 1.00 to 9.00 mass %.

4. The toner according to claim 1, wherein the toner particle has a core-shell structure comprising a core particle bearing a shell on a surface of the core particle, the core comprises the crystalline polyester resin, and the shell comprises the amorphous resin.

5. The toner according to claim 4, wherein the core particle comprises boric acid.

6. The toner according to claim 1, wherein the crystalline polyester resin is a block polymer having a crystalline polyester segment and an amorphous polyester segment, and the crystalline polyester segment has a structure represented by formula (1)

(1)

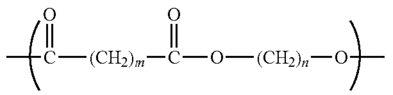

where m represents an integer of 6 to 14, and n represents an integer of 6 to 16.

* * * * *